(12) United States Patent
Contreras et al.

(10) Patent No.: US 10,762,795 B2
(45) Date of Patent: Sep. 1, 2020

(54) UNMANNED AERIAL VEHICLE PRIVACY CONTROLS

(71) Applicant: Skydio, Inc., Redwood, CA (US)

(72) Inventors: Dana Livonia Contreras, San Francisco, CA (US); Lucas Palage Doyle, San Francisco, CA (US); Justin Eugene Kuehn, San Francisco, CA (US); Volkan Gurel, San Francisco, CA (US); Eric David Johnson, Walnut Creek, CA (US); Edward Dale Steakley, Cupertino, CA (US)

(73) Assignee: Skydio, Inc., Redwood City, CA (US)

( * ) Notice: Subject to any disclaimer, the term of this patent is extended or adjusted under 35 U.S.C. 154(b) by 0 days.

(21) Appl. No.: 15/088,042

(22) Filed: Mar. 31, 2016

(65) Prior Publication Data

US 2018/0025473 A1 Jan. 25, 2018

Related U.S. Application Data

(60) Provisional application No. 62/298,429, filed on Feb. 22, 2016, provisional application No. 62/292,783, filed on Feb. 8, 2016.

(51) Int. Cl.
*G01C 21/00* (2006.01)
*B64D 47/08* (2006.01)
(Continued)

(52) U.S. Cl.
CPC ........... *G08G 5/006* (2013.01); *B64C 39/024* (2013.01); *B64D 47/08* (2013.01); *G01C 21/00* (2013.01);
(Continued)

(58) Field of Classification Search
CPC ............ B64C 39/024; B64C 2201/108; B64C 2201/146; B64C 2201/127;
(Continued)

(56) References Cited

U.S. PATENT DOCUMENTS 6,509,926 B1 * 1/2003 Mills .................. G08B 13/1968
348/143
7,460,148 B1 12/2008 Clark et al.
(Continued)

FOREIGN PATENT DOCUMENTS

WO 2015-102731 7/2015
WO WO 2015126422 8/2015

OTHER PUBLICATIONS

International Search Report and Written Opinion of the International Searching Authority for PCT Application No. PCT/US2017/016860, dated May 30, 2017, 14 pages.
(Continued)

*Primary Examiner* — Behrooz M Senfi
(74) *Attorney, Agent, or Firm* — Young Basile Hanlon & MacFalane, P.C.

(57) ABSTRACT

Disclosed in this specification are methods, systems and apparatus, including computer programs encoded on non-transitory computer storage media for unmanned aerial vehicle (UAV) flight operation and privacy controls. Based on geofence types, and UAV distance from a geofence, sensors and other devices connected to a UAV are conditionally operational. Image data collected during a UAV flight may be obfuscated by the UAV while in flight, or via a post-flight process using log data generated by the UAV.

29 Claims, 8 Drawing Sheets

(51) Int. Cl.
*G08G 5/00* (2006.01)
*G05D 1/00* (2006.01)
*G05D 1/02* (2020.01)
*B64C 39/02* (2006.01)
*G06K 9/00* (2006.01)
*G06T 5/00* (2006.01)
*G01S 19/13* (2010.01)
*H04B 7/185* (2006.01)
*H04W 4/021* (2018.01)

(52) U.S. Cl.
CPC ......... *G05D 1/0033* (2013.01); *G05D 1/0061* (2013.01); *G05D 1/0094* (2013.01); *G05D 1/0274* (2013.01); *G06K 9/00201* (2013.01); *G06T 5/002* (2013.01); *G08G 5/0069* (2013.01); *B64C 2201/127* (2013.01); *G01S 19/13* (2013.01); *G06K 2209/27* (2013.01); *G06T 2207/10016* (2013.01); *G06T 2207/10032* (2013.01); *G06T 2207/20012* (2013.01); *G06T 2207/30232* (2013.01); *G06T 2207/30244* (2013.01); *H04B 7/18506* (2013.01); *H04W 4/021* (2013.01)

(58) Field of Classification Search
CPC ........ B64C 2201/042; B64C 2201/141; B64C 27/08; B64C 2201/024; B64C 2201/123; B64C 2201/126; B64C 2201/143; G08G 5/0069; G08G 5/0039; G08G 5/0034; G08G 5/0043; G08G 5/045; G08G 5/0013; G08G 5/003; G08G 5/006; G08G 5/04; G08G 5/0004; G08G 5/0008; G08G 5/0078; G08G 5/0082; G08G 5/0086; H04N 2013/0081; H04N 7/185; H04N 13/00; H04N 13/0011; H04N 13/0246; H04N 13/0271; H04N 17/002; H04N 5/232; H04N 5/378; H04N 5/23238; H04N 5/33; H04N 5/23203
USPC .............................................. 348/211.3, 211.6
See application file for complete search history.

(56) References Cited

U.S. PATENT DOCUMENTS

| 8,721,197 | B2* | 5/2014 | Miyahara | H04N 5/232 |
| | | | | 396/427 |
| 9,127,908 | B2 | 9/2015 | Miralles | |
| 9,273,981 | B1* | 3/2016 | Downey | B64C 39/024 |
| 9,412,278 | B1* | 8/2016 | Gong | H04L 63/101 |
| 9,563,201 | B1* | 2/2017 | Tofte | G05D 1/0038 |
| 9,588,516 | B1 | 3/2017 | Gurel et al. | |
| 9,618,940 | B1* | 4/2017 | Michini | G05D 1/101 |
| 2004/0174434 | A1* | 9/2004 | Walker | G06F 17/30265 |
| | | | | 348/211.3 |
| 2004/0249519 | A1 | 12/2004 | Frink | |
| 2006/0148418 | A1 | 7/2006 | Purkayastha et al. | |
| 2008/0033604 | A1 | 2/2008 | Margolin | |
| 2008/0094491 | A1* | 4/2008 | Hsu | G06K 9/40 |
| | | | | 348/246 |
| 2009/0041295 | A1* | 2/2009 | Matsuzaka | H04N 5/23293 |
| | | | | 382/100 |
| 2009/0044117 | A1* | 2/2009 | Vaughan | G11B 27/034 |
| | | | | 715/716 |
| 2009/0125223 | A1 | 5/2009 | Higgins | |
| 2009/0248287 | A1 | 10/2009 | Limbaugh et al. | |
| 2010/0198514 | A1 | 8/2010 | Miralles | |
| 2010/0231731 | A1* | 9/2010 | Motomura | H04N 5/23248 |
| | | | | 348/208.4 |
| 2011/0147515 | A1 | 6/2011 | Miller | |
| 2012/0176494 | A1* | 7/2012 | Kamon | G01C 11/06 |
| | | | | 348/135 |
| 2012/0237028 | A1 | 9/2012 | Khazan et al. | |
| 2013/0070092 | A1* | 3/2013 | Miyahara | H04N 5/232 |
| | | | | 348/143 |
| 2013/0311009 | A1 | 11/2013 | McAndrew et al. | |
| 2014/0140575 | A1* | 5/2014 | Wolf | G06K 9/3233 |
| | | | | 382/103 |
| 2014/0142787 | A1 | 5/2014 | Tillotson et al. | |
| 2014/0316614 | A1 | 10/2014 | Newman | |
| 2014/0371952 | A1 | 12/2014 | Ohtomo | |
| 2015/0062339 | A1 | 3/2015 | Ostrom | |
| 2015/0142211 | A1 | 5/2015 | Shehata et al. | |
| 2015/0230150 | A1 | 8/2015 | Wang | |
| 2015/0323930 | A1* | 11/2015 | Downey | G08G 5/006 |
| | | | | 701/2 |
| 2016/0025457 | A1 | 1/2016 | Miralles | |
| 2016/0035224 | A1 | 2/2016 | Yang et al. | |
| 2016/0068267 | A1 | 3/2016 | Liu | |
| 2016/0161258 | A1 | 6/2016 | Magson et al. | |
| 2016/0163204 | A1 | 6/2016 | Paptopoulos et al. | |
| 2016/0224766 | A1* | 8/2016 | Steelberg | G06F 21/10 |
| 2016/0227259 | A1* | 8/2016 | Brav | H04N 5/23206 |
| 2016/0307447 | A1* | 10/2016 | Johnson | G05D 1/0044 |
| 2016/0328983 | A1 | 11/2016 | Hutchinson et al. | |
| 2016/0332739 | A1* | 11/2016 | Wong | B64C 39/00 |
| 2016/0335476 | A1* | 11/2016 | Renkis | G06K 9/0063 |
| 2016/0358432 | A1* | 12/2016 | Branscomb | G08B 13/1965 |
| 2016/0364579 | A1 | 12/2016 | Wilmes | |
| 2016/0373699 | A1* | 12/2016 | Torres | G05D 1/0038 |
| 2017/0083979 | A1* | 3/2017 | Winn | G06Q 40/08 |
| 2017/0084037 | A1* | 3/2017 | Barajas Hernandez | |
| | | | | G06T 7/0044 |
| 2017/0148328 | A1 | 5/2017 | Chan et al. | |
| 2017/0169713 | A1 | 6/2017 | Gong et al. | |
| 2017/0192424 | A1* | 7/2017 | Poole | G05D 1/0044 |
| 2017/0229022 | A1 | 8/2017 | Gurel et al. | |
| 2017/0235018 | A1 | 8/2017 | Foster et al. | |
| 2017/0269590 | A1 | 9/2017 | Feng | |
| 2017/0293301 | A1* | 10/2017 | Myslinski | G05D 1/0088 |
| 2017/0357273 | A1 | 12/2017 | Michini et al. | |
| 2017/0372514 | A1* | 12/2017 | Grufman | G06T 17/05 |
| 2018/0025649 | A1 | 1/2018 | Contreras et al. | |

OTHER PUBLICATIONS

International Search Report and Written Opinion in International Application No. PCT/US2017/018863, dated May 24, 2017, 10 pages.

* cited by examiner

UNMANNED AERIAL VEHICLE PRIVACY CONTROLS

CROSS-RELATED APPLICATIONS

This application claims the benefit of priority from U.S. Provisional Application No. 62/292,783, filed Feb. 8, 2016, and U.S. Provisional Application No. 62/298,429, filed Feb. 22, 2016, which provisional applications are incorporated by reference herein in their entirety.

BACKGROUND

Many unmanned aerial vehicles are configured to collect images, video and other data. As unmanned aerial vehicle (UAV, also referred to as a "drone") operations become more prevalent, UAVs may increasingly fly around areas where privacy is of a heightened concern. Flight and post-flight operations of UAVs may be configured to address privacy concerns with regard to data collection and flight path operation.

SUMMARY

A UAV computer system may be configured to limit or disable the use of certain sensors or payload devices connected to the UAV in or about a geofence. The UAV can be configured to limit sensor data being captured of another property beyond the geofence within the sensor's field of view (FOV). The UAV computer system may be configured so UAV operation of the sensors or payload devices are temporarily disabled or their functionality restricted when in proximity to a geofence boundary.

Subject matter described in this specification can be embodied in a system, method or computer program product including the action of navigating a UAV within or in proximity to a geofence. While the UAV is in flight, the UAV may obtain flight information from, for example, a global navigation satellite system (GNSS) receiver and determine a geospatial position of the UAV. A UAV computer system can then determine the UAV geospatial position relative to the boundary of the geofence (e.g., a closest boundary). The UAV computer system may perform one or more privacy operations if the UAV is within a particular distance to the boundary of the geofence. Some privacy operations include but are not limited to positioning a sensor (e.g., pointing a camera lens) away from the direction of the geofence boundary or disabling operation of a payload device. In the context of the camera, the positioning may be done by orienting the body of the UAV or a gimbaled camera to a position where the lens of the camera points in a direction away from the geofence boundary. If the UAV is flying above a geofence over a private property, a gimbaled camera can be positioned such that the camera cannot capture images of the private property. In some implementations, the camera can be disabled, its functionality restricted or the camera parameters adjusted (e.g., adjust aperture, focal length) to obfuscate an object in the image (e.g., in the background of the image).

Additionally, images obtained from an aerial inspection of a particular property may be modified to obfuscate portions of images that may contain imagery of other properties besides the property being inspected. The UAV computer system can be configured to allow for real-time graphics processing to obfuscate or delete portions of still images or videos taken by the UAV. Additionally, post-flight processing may be performed on the still images or videos. For example, a flight planning system (FPS) or a ground control system (GCS) may use UAV flight log data to correlate a still image or video frame with a particular location and an orientation of the camera with respect to a geofence boundary. The UAV, GCS, or FPS, can utilize one or more of GNSS data, inertial measurement unit (IMU) data, ground altitude data and imagery data (e.g., satellite imagery) to determine portions of the imagery that are to be obfuscated (e.g., blurred). The FPS or GCS system can identify those images, video frames, or portions of images or video frames that may include imagery captured outside of the geofence boundary and obfuscate the images, video frames or portions of the images or video frames.

The details of one or more embodiments of the subject matter of this specification are set forth in the accompanying drawings and the description below. Other features, aspects, and advantages of the subject matter will become apparent from the description, the drawings, and from the claims.

DETAILED DESCRIPTION

Figure 1:
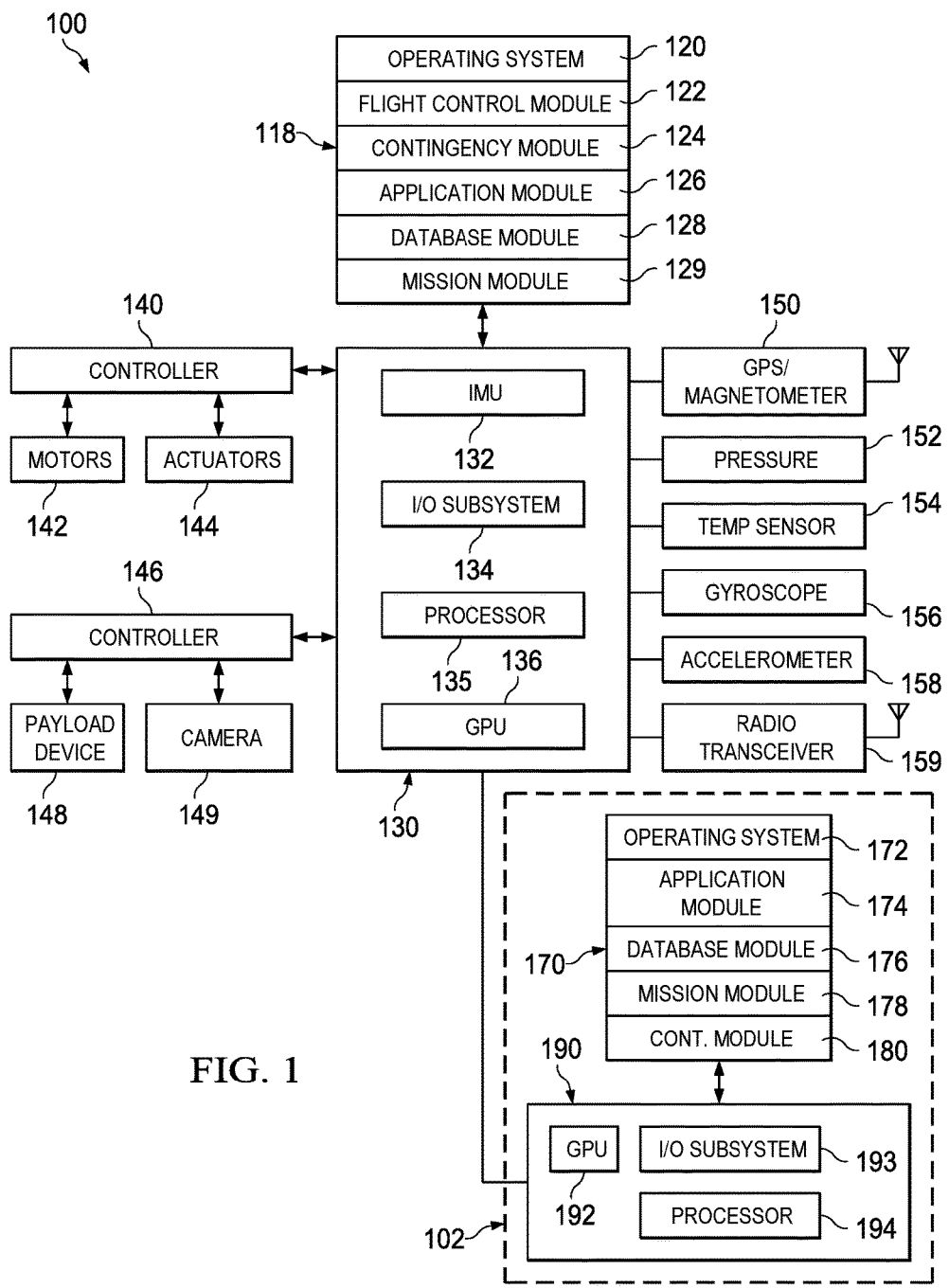
FIG. 1 is a block diagram of an example flight control system architecture for a UAV.

FIG. 1 is a block diagram of an example Unmanned Aerial Vehicle (UAV) architecture for implementing the features and processes described herein. A UAV can include a primary computer system 100 and a secondary computer system 102. The UAV primary computer system 100 can be a system of one or more computers, or software executing on a system of one or more computers, which is in communication with, or maintains, one or more databases. The UAV primary computer system 100 can include a processing subsystem 130 including of one or more processors 135, graphics processor units (GPUs) 136, input/output (I/O) subsystem 134 and an inertial measurement unit (IMU) 132. In addition, the primary computer system 100 can include logic circuits, analog circuits, associated volatile and/or non-volatile memory, associated input/output data ports, power ports, etc., and include one or more software processes executing on one or more processors or computers. The primary computer system 100 can include memory 118. Memory 118 may include non-volatile memory, such as one or more magnetic disk storage devices, solid-state hard drives, or flash memory. Other volatile memory such a RAM, DRAM, SRAM may be used for temporary storage of data while the UAV is operational. Databases may store information describing UAV flight operations, flight plans, contingency events, geofence information, component information, and other information.

The primary computer system 100 may be coupled to one or more sensors, such as GNSS receivers 150 (e.g., GPS receivers), temperature sensor 154 (e.g., a thermometer), gyroscopes 156, accelerometers 158, pressure sensors (static or differential) 152, current sensors, voltage sensors, magnetometers, hydrometers, and motor sensors. The UAV may use IMU 132 for use in inertial navigation of the UAV. Sensors can be coupled to the primary computer system 100 or to controller boards coupled to the primary computer system 100. One or more communication buses, such as, for example, a controller area network (CAN) bus, or signal lines, may communicatively couple the various sensor and components.

Various sensors, devices, firmware and other systems may be interconnected to support multiple functions and operations of the UAV. For example, the primary computer system 100 may use various sensors to determine the UAV's current geospatial position, attitude, altitude, velocity, direction, pitch, roll, yaw and/or airspeed. The primary computer system 100 may also use various sensors to pilot the UAV along a specified flight path and/or to a specified location and/or to control the UAV's attitude, velocity, altitude, and/or airspeed (optionally even when not navigating the UAV along a specific flight path or to a specific location).

The flight control module 122 handles flight control operations of the UAV. The module interacts with one or more controllers 140 that control operation of motors 142 and/or actuators 144. For example, the motors may be used for rotation of propellers, and the actuators may be used for flight surface control such as ailerons, rudders, flaps, landing gear, and parachute deployment.

The contingency module 124 monitors and handles contingency events. For example, the contingency module may detect that the UAV has crossed a boundary of a geofence, and then instruct the flight control module 122 to return to a predetermined landing location. In some implementations, the contingency module 124 may detect that the UAV is flying out of a visual line-of-sight (VLOS) from a ground operator and instruct the flight control module 122 to perform a contingency action, e.g., to land at a landing location. Other contingency criteria may be the detection of a low battery or fuel state, malfunctioning of an onboard sensor, motor or actuator, or a deviation from the flight plan. The foregoing is not meant to be limiting, as other contingency events may be detected. In some instances, if equipped on the UAV, a parachute may be deployed if the motors or actuators fail.

The mission module 129 processes the flight plan, waypoints, and other associated information with the flight plan as provided to the UAV in a flight package. The mission module 129 works in conjunction with the flight control module 122. For example, the mission module 129 may send information concerning the flight plan to the flight control module 122, for example waypoints (e.g., latitude, longitude, altitude), flight velocity, so that the flight control module 122 can autopilot the UAV.

The UAV may have various sensor and other devices connected to the UAV for performing a variety of task, such as data collection. For example, the UAV may carry a camera 149, which can be, for example, a still image camera, a video camera, an infrared camera, or a multispectral camera. In addition, the UAV may carry a Lidar, radio transceiver, sonar, and traffic collision avoidance system (TCAS). Data collected by the devices may be stored on the sensor or device collecting the data, or the data may be stored on memory 118 of the primary computer system 100.

The primary computer system 100 may be coupled to various radios, e.g., transceivers 159 for manual control of the UAV, and for wireless or wired data transmission to and from the UAV primary computer system 100, and optionally a UAV secondary computer system 102. The UAV may use one or more communications subsystems, such as a wireless communication or wired subsystem, to facilitate communication to and from the UAV. Wireless communication subsystems may include radio transceivers, infrared, optical ultrasonic and electromagnetic devices. Wired communication systems may include ports such as Ethernet, USB ports, serial ports, or other types of port to establish a wired connection to the UAV with other devices, such as a GCS, an FPS, or other devices, for example a mobile phone, tablet, personal computer, display monitor, or other network-enabled devices. The UAV may use a light-weight wire tethered to a GCS for communication with the UAV. The wire may be affixed to the UAV, for example via a magnetic coupler.

Flight data logs may be generated by reading various information from the UAV sensors and operating system 120 and storing the information in computer-readable media (e.g., memory 118). The data logs may include a combination of various data, such as time, altitude, heading, ambient temperature, processor temperatures, atmospheric pressure, battery level, fuel level, absolute or relative position, position coordinates (e.g., GPS coordinates), pitch, roll, yaw, ground speed, humidity level, velocity, acceleration and contingency information. This foregoing is not meant to be limiting, and other data may be captured and stored in the flight data logs. The flight data logs may be stored on a removable medium. The medium can be installed on the GCS or onboard the UAV. The data logs, and individual data from the sensor or operating system, may be wirelessly transmitted to the GCS or to the FPS.

Modules, programs or instructions for performing flight operations, contingency maneuvers, and other functions may be performed with operating system 120. In some implementations, the operating system 120 can be a real-time operating system (RTOS), UNIX, LINUX, OS X, WINDOWS, ANDROID or other operating system. Additionally, other software modules and applications may run on the operating system 120, such as the flight control module 122, contingency module 124, application module 126, database module 128 and mission module 129. Typically flight critical functions will be performed using the primary computer system 100. Operating system 120 may include instructions for handling basic system services and for performing hardware dependent tasks.

In addition to the UAV primary computer system 100, the secondary computer system 102 may be used to run another operating system 172 to perform other functions. The UAV secondary computer system 102 can be a system of one or more computers, or software executing on a system of one or more computers, which is in communication with, or maintains, one or more databases. The UAV secondary computer system 102 can include a processing subsystem 190 of one or more processors 194, GPUs 192 and I/O subsystem 193. The UAV secondary computer system 102 can include logic circuits, analog circuits, associated volatile and/or non-volatile memory, associated I/O data ports, power ports, etc., and include one or more software processes executing on one or more processors or computers. The UAV second computer system 102 can include memory 170. Memory 170 may include non-volatile memory, such as one or more magnetic disk storage devices, solid state hard drives, flash memory. Other volatile memory such a RAM, DRAM, SRAM may be used for storage of data while the UAV is operational.

Ideally modules, applications and other functions running on the secondary computer system 102 will be non-critical functions in nature. If the function fails, the UAV will still be able to safely operate. The UAV secondary computer system 102 can include operating system 172. In some implementations, the operating system 172 can be based on real time operating system (RTOS), UNIX, LINUX, OS X, WINDOWS, ANDROID or other operating system. Additionally, other software modules and applications may run on the operating system 172, such as an application module 174, database module 176, mission module 178 and contingency module 180. Operating system 172 may include instructions for handling basic system services and for performing hardware dependent tasks.

The UAV can include controllers 146. Controllers 146 may be used to interact with and operate a payload device 148, and other devices such as camera 149. Camera 149 can include a still-image camera, video camera, infrared camera, multispectral camera, stereo camera pair. In addition, controllers 146 may interact with a Lidar, radio transceiver, sonar, laser ranger, altimeter, TCAS and Automatic dependent surveillance-broadcast (ADS-B) transponder. Optionally, the secondary computer system 102 may include controllers to control payload devices.

Figure 2:
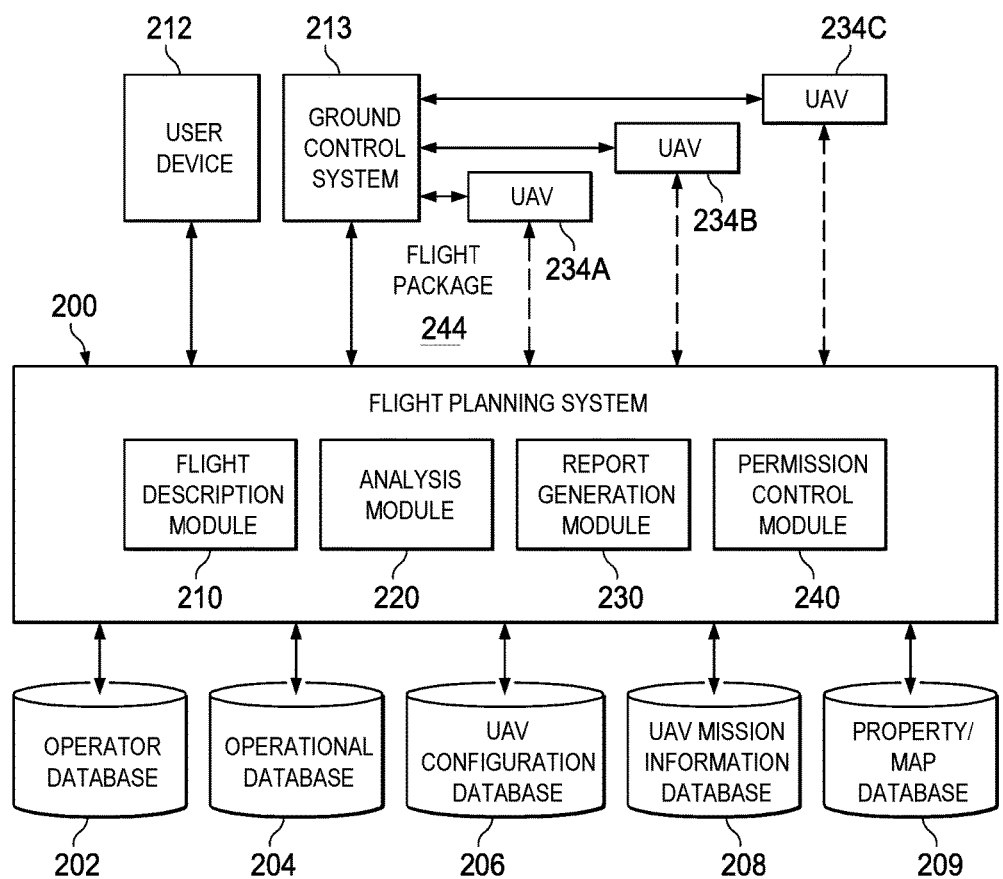
FIG. 2 is a block diagram of an example flight planning system.

FIG. 2 is a block diagram illustrating an example FPS 200. The various illustrated components may communicate over wired and/or wireless communication channels (e.g., networks, peripheral buses, etc.). FPS 200 can be a system of one or more computer processors, or software executing on a system of one or more computers. The FPS 200 can maintain and communicate with one or more databases (e.g., databases 202-209), storing information describing prior implemented flight plans and information associated with each flight plan (e.g., information describing a UAV, an operator, property/map, mission, database, etc.). The databases can include operator database 202, operational database 204, UAV configuration database 206, UAV mission information database 208 and property and map database 209.

The FPS 200 can be a system of one or more processors, graphics processors, logic circuits, analog circuits, associated volatile and/or non-volatile memory, associated input/output data ports, power ports, etc., and include one or more software processes executing on one or more processors or computers. The FPS 200 can be a component of, or be coupled to, one or more devices including one or more processors and configured to send data to and receive data from one or more UAVs 234A, 234B and 234C. A GCS 213 can be a specialized user device 212 configured to control one or more aspects of a flight of UAVs 234A, 234B and 234C.

The FPS 200 may store, and maintain, flight operation information associated with a UAV. Flight operation information may include configuration information of each UAV, flight mission and planned flight path, operator information, the UAV's precise three-dimensional (3D) location in space, velocity information, UAV status (e.g., health of components included in the UAV), contingency plans, and so on. The FPS 200 can receive flight path data (e.g., from an operator's device or an interactive user interface), and determine, information describing a flight plan. The FPS 200 can provide a flight package 244 associated with the flight plan to a UAV (e.g., UAV 234A, 234B, 234C) to implement. The flight package 244 may be provided to the GCS 213 and transmitted to the UAV, or the FPS 200 may transmit the flight package 244 direction to the UAV. Additionally, the FPS 200 can store flight plan information, flight data log information, job information in the various databases.

The example FPS 200 includes a flight description module 210 that can generate one or more interactive user interfaces (e.g., HTML or XML content for web pages) for rendering on a user device (e.g., user device 212). The interactive user interfaces may optionally be transmitted for display to the user device via a wireless network or other communication channel. User device 212 can receive, from an operator, information describing a flight plan to be performed by the UAV (e.g., performed by UAV 234A, 234B or 234C).

To describe one or more locations where the flight plan is to be conducted, a user interface may be configured to receive, from an operator, location information associated with the flight plan (e.g., an address of a home or property, geospatial position coordinates of a structure to be inspected, etc.). The flight description module 210 can obtain information describing the location. For instance, the information can include property boundaries associated with an address (e.g., boundaries of a home, obtained from a database, or system that stores or configured to access property boundary information), obstacles associated with the location (e.g., nearby trees, electrical towers, telephone poles) and/or other information. Additionally, the flight description module 210 can obtain imagery, such as geo-rectified imagery (e.g., satellite imagery), associated with the entered location information. The flight description module 210 can include some or all of the information describing the location (e.g., the obtained imagery or boundary information) in an interactive user interface to be presented on the user device 212 to an operator.

The operator of the user device 212 may interact with user interfaces to describe a flight boundary geofence (as described further below) for a UAV to enforce. For instance, the user device 212 can receive imagery associated with operator-entered location information, and present one or more geofence shapes layered on the imagery. The user interface provides functionality for the operator to select a presented shape (e.g., a polygon), and further functionality enabling the user to drag and/or drop the shape to surround an area of interest in the received imagery to limit allowable locations of a UAV to locations within the shape. Optionally, the user interface may allow the user device 212 to receive input (e.g., of a finger or stylus) tracing a particular shape onto a touch-screen display of the user device 212. The flight description module 210 can store information describing the trace as a flight boundary geofence. Accordingly, the user device 212 can provide information describing the traced shape to the flight description module 210 (e.g., coordinates associated with the imagery). The flight description module 210 can correlate the traced shape to location information in a real-world coordinate system (e.g., geospatial coordinates in a geodetic (lat/lon) coordinate frame that correspond to the traced shape).

Similarly, a user interface can enable the operator to describe safe locations for a UAV to begin the flight plan (e.g., a launching location where the UAV takes off from the ground) and end the flight plan (e.g., a landing location where the UAV lands). As an example, the flight description module 210 can analyze the obtained imagery associated with the entered location information and identify a geometric center of a convex area (e.g., a biggest convex area) within the geofence boundary that does not include obstructions (e.g., trees). For example, the flight description module

210 can determine an open area, such as an open pasture. Similarly, the flight description module 210 can obtain topographical information associated with the entered location information and can detect substantially flat areas (e.g., areas with less than a threshold of variance in height). For instance, the flight description module 210 can determine that an open space (e.g., an open clearing that is substantially flat) is a safe launching location for the UAV to take-off from, and can provide information recommending the open space in an interactive user interface presented on the user device 212. Additionally, the flight description module 210 can analyze the obtained imagery and locate physical features that are generally known to be safe locations for take-off and landing. For example, the flight description module 210 can determine that a driveway of a home associated with the flight plan is safe and can select the driveway as a safe take off and landing location, or can recommend the driveway as a safe launching and landing location.

The flight description module 210 can receive (e.g., from a user interface) survey or flight mission information, for instance information indicating a particular type of survey for a UAV to perform (e.g., damage inspection, inspection of a vertical structure, inspection of a rooftop). The flight description module 210 can receive waypoints for the UAV to travel to, including an order in which the waypoints are to be traveled to, a ranking or importance of each, or a group of, waypoints, and specific actions for the UAV to take while traveling to, or after reaching, each waypoint. For instance, a user interface can optionally enable the operator of the user device 212 to specify that upon reaching a particular waypoint, the UAV is to activate a particular sensor, or other payload devices, such as an infrared camera, a sensor measuring radiation, and so on. Additionally, a user interface can optionally enable the operator to specify transition speeds the UAV is to use when travelling between waypoints, or between particular waypoints.

In addition to the navigation of the UAV to the waypoints, operations to be performed at a particular location, or waypoint, may be identified by an operator using the FPS 200 or GCS 213 via a user interface. The user interface can allow an operator plan a survey to obtain sensor information (e.g., photograph or videotape) of a specified location, or of a structure. Operations of the UAV may be automatically configured by either the FPS 200 or GCS 213 depending on the type of inspection to be performed.

The flight description module 210 can receive information describing, or relevant to, configuration information of a UAV, such as a type of UAV (e.g., fixed-wing, single rotor, multi-rotor, and so on). In addition, the flight description module 210 can receive information describing, or relevant to, configuration information of sensors or other payload devices required for the survey or flight mission information, and general functionality to be performed. The flight description module 210 can then determine recommendations of particular UAVs (e.g., UAVs available to perform the flight plan) that comport with the received information. Similarly, the flight description module 210 can determine that based on the received survey type, a UAV will require particular configuration information, and recommend the configuration information to the operator. For instance, the flight description module 210 can receive information identifying that hail damage is expected, or is to be looked for, and can determine that a UAV which includes particular sensors, and specific visual classifiers to identify hail damage, is needed. For example, the flight description module 210 can determine that a heat and/or thermal imaging sensor that includes specific visual classifiers that can discriminate hail damage from other types of damage (e.g., wind damage, rain damage, and so on) is needed.

The flight description module 210 can utilize received survey or flight mission information to determine a flight pattern for a UAV to follow. For instance, the flight description module 210 can determine a path for the UAV to follow between each waypoint (e.g., ensuring that the UAV remains in the geofence boundary). Additionally, the flight description module 210 can determine, or receive information indicating, a safe minimum altitude for the UAV to enforce, the safe minimum altitude being an altitude at which the UAV is safe to travel between waypoints. The safe minimum altitude can be an altitude at which the UAV will not encounter obstacles within the geofence boundary (e.g., a height above buildings, trees, towers, poles, etc.). Similarly, the safe minimum altitude can be based on a ground sampling distance (GSD) indicating a minimum resolution that will be required from imagery obtained by the UAV while implementing the flight plan (e.g., based in part on capabilities of an included camera, such as sensor resolution, sensor size, and so on).

The flight description module 210 can receive a time that the flight plan is to be performed (e.g., a particular day, a particular time at a particular day, a range of times, and so on). The flight description module 210 can then determine an availability of UAVs and/or operators at the received time(s). For example, the module 210 can obtain scheduling information). Additionally, the flight description module 210 can filter available UAVs according to determined configuration information (e.g., as described above). Optionally, the flight description module 210 can access weather information associated with the received time(s), and determine an optimal time or range of times for the job to be performed. For instance, a UAV that includes particular sensors (e.g., electro-optic sensors) can obtain better real-world information at particular times of day (e.g., at noon on a sunny day can provide better imagery by maximizing image contrast and minimizing the effects of shadows). The flight description module 210 can determine the flight plan accordingly.

The FPS 200 can provide a flight package 244 that includes the determined flight plan directly to a UAV (e.g., the UAV 234A, 234B or 234C). Optionally, the FPS 200 can provide the flight package 244 to a user device 212 or GCS 213. The user device 212 or GCS 213 can modify the flight plan or preserve the flight plan in the flight package 244. The user device 212 or GCS 213 can transmit the flight package 244 to the UAV 234A, 234B, 234C. Optionally, the flight package 244 can include a flight manifest file (e.g., an XML file) identifying necessary application and version information to conduct the flight plan. For instance, the UAV can be required to execute a particular application (e.g., "app" downloaded from an electronic application store) that provides functionality necessary to conduct the flight plan. As an example, an application can effect a flight plan associated with inspecting vertical structures, and the UAV can be required to execute the application prior to initiation of the flight plan.

In particular, the FPS 200 may create a flight plan for automated or partially automated flight of a UAV, taking into consideration structural data to avoid situations where the UAV may fly out of VLOS of a base location. The base location can include one or more locations of an operator of a UAV. In some implementations, the base location can be a geospatial position of the user device 212 or a launching location of the UAV.

The FPS 200 may receive, via a user interface 214, a location for an aerial survey to be conducted by an unmanned aerial vehicle. One or more images may be displayed depicting a view of the location. The interface allows for a selection of a launching location of the UAV. As the images have associated geospatial positions, the FPS 200 can determine an associated latitude/longitude for the launching location. The user interface 214 may receive an input or selections for one or more flight waypoints. Similar to the launching locations, the flight waypoints having an associated geospatial position. The FPS 200 may assign altitudes for the flight waypoints, or altitudes for the flight waypoints may be determined by a user, and specific numeric altitudes values may be set.

The FPS 200 may determine based on the launching location and altitude of the one or more flight waypoints whether a flight waypoint may cause a non-VLOS occurrence. From the launching location, a flight plan may be generated using waypoints having associated latitude and longitude coordinates, and an associated altitude. The FPS 200 may not allow a UAV waypoint where the VLOS from the base location (e.g., the launching location, or an area around the launching location) would be blocked because of a structure. The FPS 200 may use 3D polygonal data, topographical data or other structure data in generating the flight plan. The FPS system 200 could use a 3D coordinate system to determine, based on a base location and each waypoint location, whether the UAV would likely enter into a non-VLOS situation. The FPS 200 can then generate a flight plan that avoids the non-VLOS situation and includes only the flight waypoints that would not cause a non-VLOS occurrence.

Additionally, the FPS 200 may determine a geofence boundary to limit flight of the UAV to a bounded area. The user interface 214 may display the geofence boundary over one or more location images. Additionally, the flight planning system 200 may determine a survey area, and set the survey area within the geofence boundary.

During or after a flight plan by a UAV is conducted, the FPS 200 receives, from a GCS 213 (or directly from the UAV), data (such as flight log data and collected sensor data). A user interface of the FPS 200 then displays at least a portion of sensor data collected by the UAV, information describing a planned survey, and information associated with the flight data package.

Similar to the FPS 200, the GCS 213 may also be used for flight and contingency planning. The GCS 213 can receive flight plans from the FPS 200 for transmission to the UAV. The GCS 213 also allows for manual override of a UAV operating in an autopilot mode. A flight plan may be transmitted to the UAV either via a wireless or tethered connection. Ideally, the GCS 213 is a mobile device, such a laptop, mobile phone, tablet device, with a cellular and other wireless connection for data transmission over the Internet or other network.

Each of user devices 212, including specialized user device 212 designated as GCS 213, can be a system of one or more computers, or software executing on a system of one or more computers, which is in communication with, or maintains, one or more databases, e.g., databases, storing information describing UAV flight operations and components. Each of the user devices 212 can be a system of one or more processors, graphics processors, logic circuits, analog circuits, associated volatile and/or non-volatile memory, associated I/O data ports, power ports, etc., and include one or more software processes executing on one or more processors or computers.

Although in one embodiment of the invention, the FPS 200 may be primarily used to create and transmit a flight package 244 to a UAV or GCS 213, the UAV or GCS 213 can initiate the request for the flight package 244 from the FPS 200. An operator may take the UAV or GCS 213 to a property location. The UAV or GCS 213 may then request the flight package 244, or an updated flight package 244 using a current position of the UAV or GCS 213. For example, the UAV or GCS 213 can determine its geospatial position via a GNSS receiver (e.g., using GPS, GLONASS, Galileo, or Beidou system). The UAV or GCS 213 can then transmit its geospatial position to the FPS 200, along with other identifying information about the requesting device, such as, for example, a unique identifier (UID) or media access control (MAC) address. The FPS 200 will receive the request, and determine if an updated or changed flight package exists by comparing the device identifier with identifiers in a database storing the new or updated flight package information. If flight planning system 200 finds a new or updated flight package, then the flight planning system 200 transmits the flight package from the flight planning system 200. The UAV or GCS 213 can receive the flight package. A confirmation acknowledging receipt of the flight package may then be transmitted from the UAV or GCS 213 to the FPS 200. The flight planning system 200 will then update a database record to indicate that the particular flight package has been received. Moreover, the UAV or GCS 213 can supply the property location, and a new job request can be sent to the FPS 200. The flight planning system 200 may create a new flight package for the UAV or GCS 213.

For autonomous flight of a UAV (UAV 234A, 234B or 234C), a flight plan may be created and transmitted to the UAV. The flight plan instructs the UAV with regard to a particular flight path. A flight plan may be created using the flight planning system 200, or GCS 213. A flight plan instructs the UAV where it should fly in a 3D space. The flight plan includes a series of connected waypoints that define where the UAV should fly and what actions that the UAV should complete during a particular flight. The UAV may have an autopilot flight module operating on the UAV computer system that uses the flight plan to automatically fly the UAV. The flight plan information may be provided to the GCS 213 (and then to the UAV) or directly to the UAV, in a flight package 244 comprising the flight plan and other information (such as contingency event instructions).

Using the flight planning system 200, or a GCS 213, a user may select a series of geographically-based waypoints and a launching location for the UAV. Based on the waypoints, a flight plan may be constructed allowing the UAV to autonomously navigate itself. In some implementations, the flight planning system 200, or GCS 213 may automatically define a flight plan based on various criteria, such as an inspection, or survey type.

While the primary computer system 100 autopilot module is navigating the UAV according to a flight plan, certain aspects of the flight pattern may be controlled by the operator's user device 212, or GCS 213. The flight plan or pattern may be configured such that for a particular waypoint, a vertical ascent/descent rate, UAV altitude, horizontal UAV rotation, payload gimbal, payload direction, waypoint transition speed, or trigger of a payload sensor may be controlled by the UAV operator. The user device 212, or GCS 213, may have a physical control device such as a toggle or joystick, or virtual control in a user interface that allows the operator to control vertical ascent/descent rate, UAV altitude, UAV attitude, horizontal UAV rotation, payload gimbal, payload direction. The user device 212, or GCS 213, can trigger a payload sensor while conducting the inspection. For example, the UAV may navigate via autopilot to a position over an inspection location. An operator then can provide input to the user device 212, or GCS 213. The user device, or GCS, may transmit a signal or information corresponding to the user input to the UAV via radio communication. The signal or information can control the vertical ascent/descent rate, UAV altitude, UAV attitude, horizontal UAV rotation, payload gimbal, or payload direction, or waypoint transition speed. The signal or information can trigger a payload sensor to turn on or turn off. This particular mode allows for partial autopilot control and partial or complete manual control of the UAV. Even though the operator may manually control certain aspects of the flight plan, if one has been set, the UAV can remain within a geofence boundary envelope and to remain within VLOS of the operator operating user device 212.

In another example, the UAV may be partially manually controlled by an operator using the user device 212 while the UAV is in autopilot mode. The UAV may receive a command from the user device 212 to nudge the UAV in a particular direction. In this case, the control input of the user device 212 causes the user device 212 to send a command to the UAV, instructing the UAV to move slightly, for example between 0.1 to 3 meters, in a particular direction (in an x, y, or z axis, or diagonally). The particular distance can be predetermined, or be variable based on the proximity to a structure. Nudging the UAV allows the operator to move the UAV away from the structure if the operator sees that the UAV is flying too close to the structure. The nudge command may be provided any time to the UAV while it is operating in an autopilot mode. The UAV should still enforce geofence boundaries (if one has been set) and not allow a nudge to cause the UAV to move beyond a geofence boundary.

The flight planning system 200 can include a report generation module 230 and a permission control module 240. The report generation module 230 is configured to generate one or more flight reports. The flight reports can include flight data (e.g., path, duration and actions of control surfaces), sensor data (e.g., air pressure, temperature and humidity), and payload data (e.g., information gathered by a payload camera). The permission control module 240 is configured to impose one or more limits on flights of the UAV. The limits can include, for example, that the UAV shall stay inside or outside an envelope defined by geofences or by geographic coordinates or that the UAV shall stay within VLOS of a base location (e.g., a location of user device 212).

Figure 3:
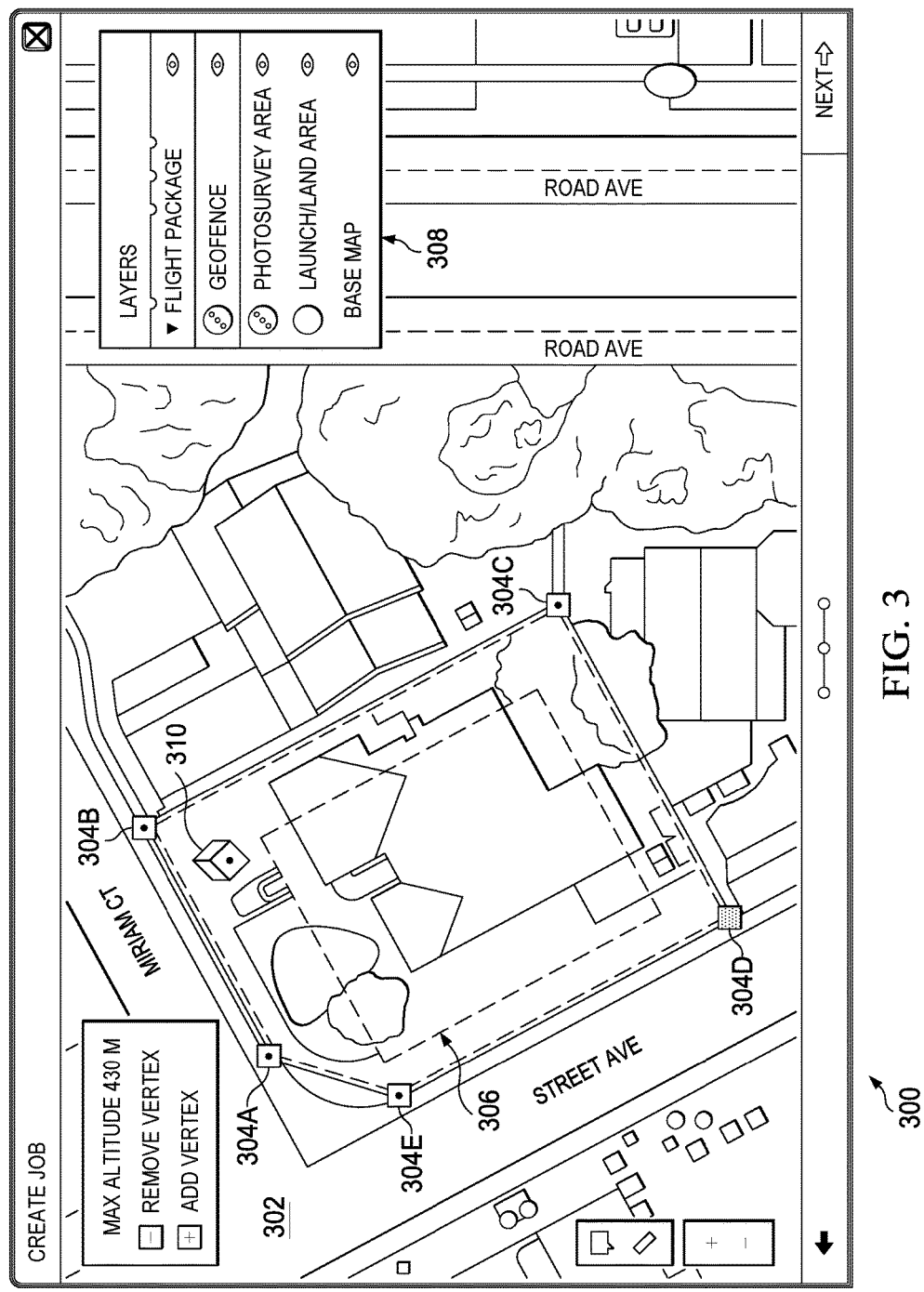
FIG. 3 illustrates an example user interface for determining a flight boundary geofence.

FIG. 3 illustrates an example user interface 300 for determining a geofence boundary. The user interface 300 is an example of an interactive user interface, generated by a system (e.g., the flight planning system 200, or a presentation system in communication with the flight planning system 200) that is configured to receive user inputs, access one or more databases, and update the user interface 300 in response to received user inputs. The user interface 300 can include a document (e.g., an interactive document such as a web page), presented on a user device (e.g., a desktop, laptop, or tablet computer, a smart-phone, or a wearable device, etc.).

The user interface 300 includes image 302 (e.g., satellite image as depicted) of a location entered by the user of the user interface 300. The image 302 included in the user interface 300 can be interactive. A user can zoom in and out of the image 302 to target a greater or smaller real-world area. For instance, the user can interact with a zoom control, or the user can utilize a touch surface (e.g., a touch screen) to zoom in and out (e.g., the user can pinch to zoom).

The user interface 300 enables the user to select areas on the image 302 that are defined by a user-specified shape. For example, the user interface 300 can receive a user selection of particular vertices that define the illustrated polygon (e.g., vertices 304A-E). The system can shade, or otherwise highlight, the internal portion of the user-specified shape. Additionally, the user interface 300 enables the user to select a particular vertex of the illustrated polygon (e.g., vertex 304A), and drag the shape into existence by moving a finger or stylus on a touch sensitive screen of the user device.

The user interface 300 can receive input for generating a flight path 306 for the UAV to include a launching and landing location 310. The user interface 300 may include a menu 308 for creating different representative layers of a flight plan. For example, menu 308 shows a flight plan specifying a geofence, a photo survey area, a launch/land area, and a base map. The menu 308 includes a geofence menu item that refers to the geofence as represented by the connected vertices 304A-304E. The menu 308 includes a photo survey area menu item representing the flight path 306. The menu 308 includes a launch/land area menu item representing the launch/land locations 310. The menu 308 includes a base map layer menu item that represents the base image layer 302, which includes image 302.

As illustrated in FIG. 3, the image 302 includes a highlighted area that defines a geofence boundary to be enforced by a UAV when implementing a flight plan. Different types of geofences may be used by the UAV during flight operations. A geofence can include a two-dimensional (2D) or 3D location-based boundary. A geofence can be understood as a virtual boundary for a geographic location or a virtual surface around a geographic location in 3D space. The geofence boundary can be represented on a map as one or more polygonal shapes or rounded shapes, for example a circle, rectangle, sphere, cylinder, cube, or other shapes or bodies. A geofence may also be a time-based (four-dimensional) virtual boundary where the geofence exists for a particular duration, for example, a number of hours or days, or for a specific time period, for example, from 2:00 PM to 4:00 PM occurring on certain days, or other periods of time. A 3D geofence may exist in a particular space above ground. A geofence may be represented by latitudinal and longitudinal connected points, or other coordinate systems. A geofence may be created such that the geofence has dynamic aspects where the geofence may increase or decrease in size based on various conditions. For UAV flight operations, geofence structures are received by the UAV and stored in non-volatile memory.

For UAV operations, different types of geofences may be created. To limit flight operations within a particular volumetric space, a 3D geofence may be created. Data representing the flight boundary geofence can be transmitted to the UAV operating system. The exemplary flight planning system or GCS may be used to create the geofence and transmit the geofence data structure to the UAV.

For both autonomous UAV flight operations and manually controlled flight operations, the UAV can be limited to flight within a flight boundary geofence. If for example, an operator of the UAV in a manually controlled mode attempts to maneuver the UAV outside of the flight boundary geofence, the UAV may detect a contingency condition (e.g., the UAV is about to fly outside of the geofence) and then automatically direct the UAV to return to a specified predetermined landing location. Furthermore, if the UAV is capable of hovering, such as a multi-rotor UAV, the UAV may be inhibited from moving across a boundary of a flight boundary geofence and the UAV could be set to hover and not continue past the boundary of the geofence.

Optionally, the system can utilize property information, such as property boundaries, and automatically include a highlighted portion of the image 302 as being a possible flight boundary geofence. For instance, as illustrated in FIG. 3, portions of the flight boundary geofence defined by connected vertices 304A, 304B, 304D and 304E abut roads included in the geographic area depicted in the image 302. The primary computer system 100 can determine that the entered location information describes a particular property (e.g., an open clearing that borders the road), and can highlight the particular property. Optionally, the primary computer system 100 can include a buffer from the property boundaries of the location to ensure that even when facing forces of nature (e.g., in a strong gust of wind) the UAV will remain within the property boundaries.

Property boundary information from a database can be used to create the flight boundary geofence to limit flight of the UAV within the property's boundary. The UAV can then be constrained for flight operations only within this geofence. The property information used to create the flight boundary geofence can be of various data types, for example, parcel polygons, vector, rasterized, shape files, or other data types. For the particular property, the FPS 200 may create the flight boundary geofence based on the property shape data. The various data types ideally can have geolocation and/or coordinate information, such as latitudinal/longitudinal points for use in orienting and creating the flight boundary geofence. The geofence envelope may be identical in shape to the property boundary. Optionally, the boundary of the geofence may be reduced in size. For example, the flight boundary geofence may be reduced in size by a set distance, for example 5 meters, towards a centroid of the property. Reduction of the flight boundary geofence creates a buffer zone. The buffer zone may help avoid an unintentional flyover of an adjacent property boundary. Optionally, the FPS 200 may display an area with parcel polygonal data. An interface of the FPS 200 may then receive a selection of one or more parcels. The FPS 200 then can use the selections to create one or more jobs and multiple geofence envelopes. For the multiple parcels, the operator would go to each parcel property and conduct multiple jobs.

Optionally, the user interface 300 can be utilized by a UAV operator to indicate waypoints to be traveled to during the flight plan. For instance, the user can select portions of the image 302 to designate as waypoints, and the user interface 300 can be updated to present selectable options associated with each waypoint. As an example, the user can designate an order that each waypoint is to be traveled to, actions the UAV is to take at the waypoint, a transition speed between each or all waypoints, and so on. The system can determine the flight boundary geofence from the waypoints, such that the geofence perimeter encompasses the waypoints. The determined flight boundary geofence can be presented to the user for review, and the user can modify the boundary by interacting with the user interface 300.

Additionally, the user interface 300 can include text provided by the user that describes the flight plan. A different user can access the user interface 300, and quickly view the determined flight boundary geofence along with text describing the flight plan. In this way, a user can quickly describe flight plan information sufficient for a UAV to implement, and other users can quickly view graphical representations of the flight plan (e.g., graphical representation of the flight boundary geofence along with textual data describing the flight plan).

Privacy Geofences

Another type of geofence that may be created is a privacy geofence. A privacy geofence may be used independent of, or in conjunction with a flight boundary geofence. A privacy geofence can be created and transmitted to the UAV such that the UAV avoids flying over the privacy geofence, or avoids flying through the privacy geofence. Also, particular operations of the UAV while flying over, or flying through a privacy geofence may be performed or inhibited. Also, certain sensors or other devices connected to the UAV may be wholly or partially disabled, wholly or partially enabled, or otherwise prevented from being used while flying over or through the privacy geofence.

The flight boundary geofence and the privacy geofence may have an associated buffer zone. The buffer zone allows the UAV to fly a particular distance over the boundary of the geofence, and not create a contingency condition. Occasionally, a UAVs estimated location may have a certain level of error, for example, possibly caused by, for example, GNSS clock drift. An associated buffer zone allows the UAV to fly a certain distance to either side of the boundary of the geofence. For example, the buffer zone could be a fixed distance, say 20 meters. So long as the UAV determines it is located within this buffer zone, the UAV will be considered to be operating within the geofence. The buffer zone can be a function of the size of the geofence. A smaller geofence will have a smaller buffer zone, for example maybe 2 meters and a larger geofence will have a larger buffer zone.

Additionally, using databases having property boundary information, a user can query the database and create a flight boundary geofence to ensure that the UAV stays within a particular property boundary. Also, an electronic database may be referenced by the FPS 200 or GCS 213 to search for predetermined privacy geofences. For example, a database may include a listing of residential addresses associated with privacy geofences. A user could enter an address, or latitudinal/longitudinal coordinates of the address, in the FPS 200 or GCS 213. The search based on the entered address or coordinates will then return a result of privacy geofences that are associated with the address, or with the latitudinal/longitudinal coordinates of the address. The privacy geofence for example may be the bounds of the property associated with the address. The privacy geofence may also be added by a user of the FPS 200 or GCS 213. For example, the user may select an area over a displayed image of an area where the privacy geofence should be placed. The privacy geofence may be displayed in colors or patterns that distinguish the privacy geofence from a flight boundary geofence. Also, in an implementation, a user may draw in a graphical user interface a shape on a displayed map, and the system identifies any privacy geofences within the area enclosed by the shape. After a flight boundary geofence is created, the FPS 200 or GCS 213 can query the database to find geographic areas enclosed within the flight boundary geofence. The FPS 200 can then create privacy geofences that would be transmitted to the UAV for use in autonomous or manual flight operations. The database may include home addresses, geographic coordinates, geographic polygonal shapes, property bounds (either 2- or 3-dimensional). In some implementations, the flight boundary geofence and the privacy geofence can be temporarily active for specified durations or for particular time periods. In some implementations, the geofence could be active during certain weather conditions, times of day, or lighting conditions.

Also, for a flight path over a populated area, a database may be accessed to find addresses or other areas identified as private, and use those addresses or other areas identified as private to create a flight plan with privacy operations taken into consideration.

Additionally, flight plan contingencies may be created. In some implementations, a flight plan contingency can instruct the UAV to perform an operation based on certain contingency criteria. For example, contingency criteria may be the detection of one or more of a low battery or fuel state, a malfunctioning of an onboard sensor, motor, actuator, a deviation from the flight plan, or a crossing over a geofence boundary by the UAV. Other contingency events may include a ground control system power or system failure, a lost or degraded telemetry link to/from the UAV and ground control system, a stuck motor or actuator, GNSS failure or degradation, autopilot sensor failure (e.g., airspeed, barometer, magnetometer, IMU sensors), a control surface failure, a gear failure, a parachute deployment failure, an adverse weather condition, a nearby aircraft in airspace, a vehicle vibration, an aircraft fly-away) and any other situation that would cause the UAV to alter its flight path or flight plan.

Privacy Operations

FIGS. 4A-4D illustrate examples of a UAV performing privacy operations while flying in autopilot mode. A UAV 400, 420, 440 and 460 is shown navigating along path 402, 422, 442 and 462 respectively. During flight along the flight path, the primary computer system 100 periodically determines the geospatial position of the UAV using information received from an onboard GNSS receiver 150. FIGS. 4A-4D illustrate different types of privacy geofences and how the UAV may take action. The primary computer system 100 may have received information about one more of the different types geofences from the GCS 213 or the FPS 200.

Figure 4A:
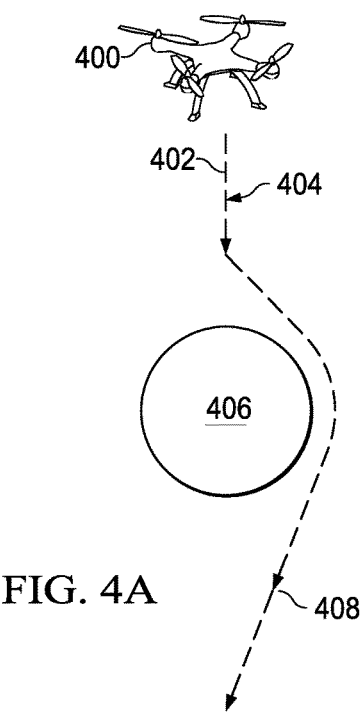
FIGS. 4A-4D illustrate examples of a UAV privacy operation where the UAV is navigating around and through two different privacy geofence types.

FIG. 4A illustrates the UAV 400 traveling along flight path 402. In this example, the primary computer system 100 of UAV 400 determines at a periodic frequency if the UAV 400 will be heading into or near a privacy geofence. The periodic frequency may be a set rate, or be a variable rate based on the speed of the UAV 400. The faster the UAV 400 travels the greater the sampling rate. At point 404 the UAV 400 has determined that, at its current altitude and direction, the UAV 400 will enter into the privacy geofence 406. The UAV 400 determines the type of geofence, for example, based on a geofence type number that indicates the type of privacy geofence. Based on the geofence type number, the geofence 406 is identified as an avoid privacy geofence (more restrictive) or a fly-though geofence (less restrictive). In this example, geofence 406 is identified as an avoid privacy geofence and the UAV automatically calculates an avoidance flight path around, above, or below the geofence 406, as shown in FIG. 4A. In some implementations, while in flight the UAV may receive data identifying new geofences that recently became active. In such cases, the flight planning system of UAV 400 can pre-calculate a new flight path 402 to avoid the new geofences.

As the UAV 400 flies closer to the privacy geofence 406, the UAV will nearly pass the boundary of the privacy geofence 406. In this case, the UAV may orient the UAV with a fixed camera, or orient a gimbaled camera to a direction pointing, for example, in an Eastern direction. The UAV computer system may refer to an onboard data store, to determine what operation should be taken for the particular geofence type. Additionally, the FPS 200 may have generated a flight path to avoid geofence 406, and at particular waypoints along the flight path, point the camera away from the geofence 406, or cause the operation of certain sensors to be temporarily suspended or inactivated due to the proximity to the geofence 406.

Figure 4B:
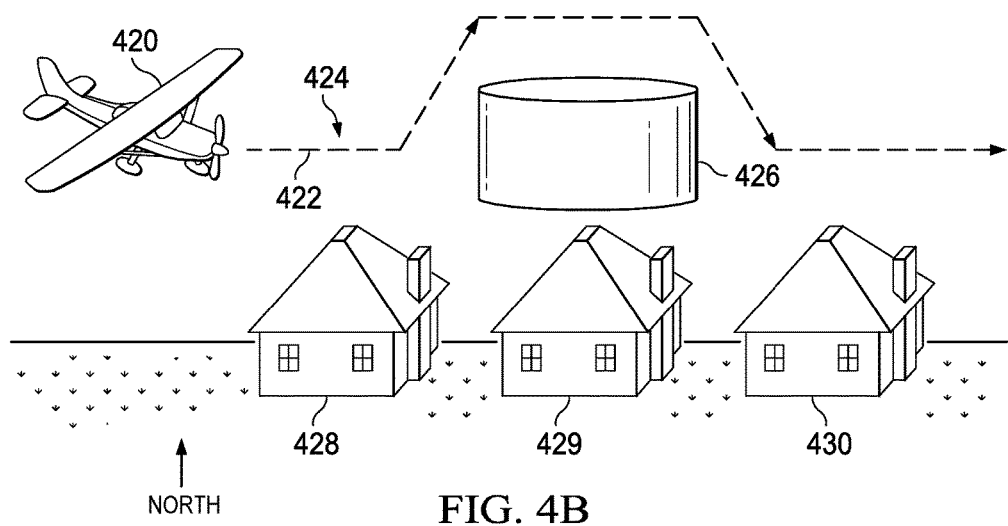
Figure 4C:
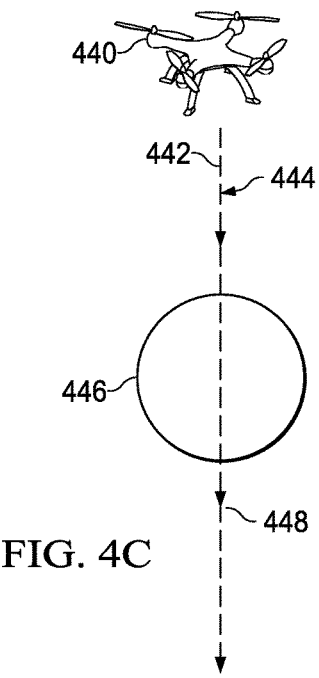
Figure 4D:
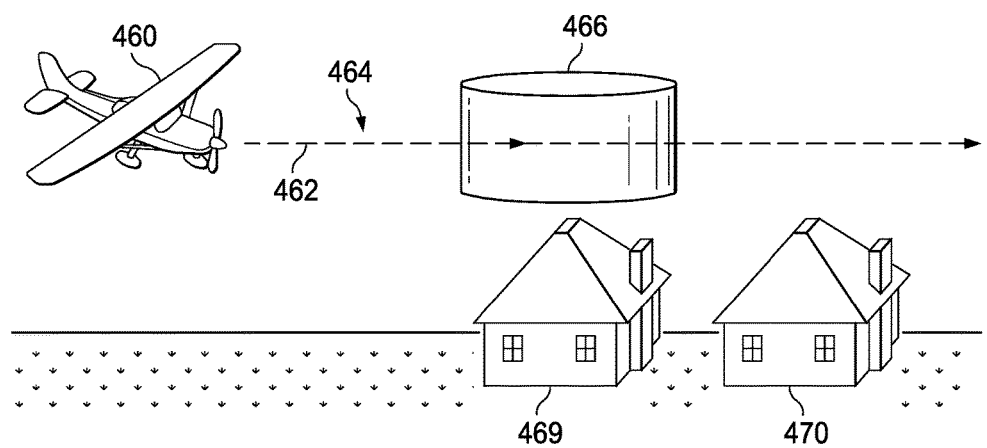

FIG. 4B illustrates the UAV 420 flying along flight path 422. At point 424 the primary computer system 100 of UAV 420 determines that it will intersect with 3D geofence 426 (modeled as a cylinder). Based on the geofence type number the UAV 420 determines that geofence 426 is an avoid type geofence (i.e., that entry into the geofence is prohibited). In this instance, the UAV 420 will determine an avoidance flight path around, above, or below the geofence 406. In this case, the UAV determined the flight path should ascend above, fly over, and then descend around the geofence 426, as shown in FIG. 4B.

As the UAV 420 flies along the flight path 424, the primary computer system 100 of the UAV 420 will determine its proximity to the intersecting boundary of the flight path 422 and the geofence 426. Depending on how the privacy controls are configured, the UAV 420 may disable or limit operation of a connected payload device, such as a camera, so that as the UAV 420 flies over the privacy geofence 426 no image data can be taken of the private residence 429. Optionally, a gimbaled camera for example, may be placed into a horizontal position (e.g., with respect to a local level coordinate system or camera platform coordinate system) so that the camera field of view cannot take images of the private residence 429 below. This privacy operation can be set so that even if the UAV 420 is flown manually, the UAV 420 will not be able to take pictures of the private residence 429 designated with the privacy geofence 426. Optionally, the UAV 420 may have stored in non-volatile memory, a database of privacy geofences for a general geographic area. While flying over a general geographic area, the primary computer system 100 of UAV 420 may refer to this onboard database, and limit camera operations and other sensors accordingly. With regard to FIGS. 4C and 4D, the UAVs 440, 460 are shown traveling through a less restrictive fly-through geofences 446 and 466 respectively. In this scenario, the primary computer systems 100 of UAVs 440, 460 will determine the respective positions of UAV 440, 460, and then limit or deactivate use of the respective sensors of the UAVs 440, 460 before the UAVs fly through the geofences 446, 466.

Figures 5, 7:
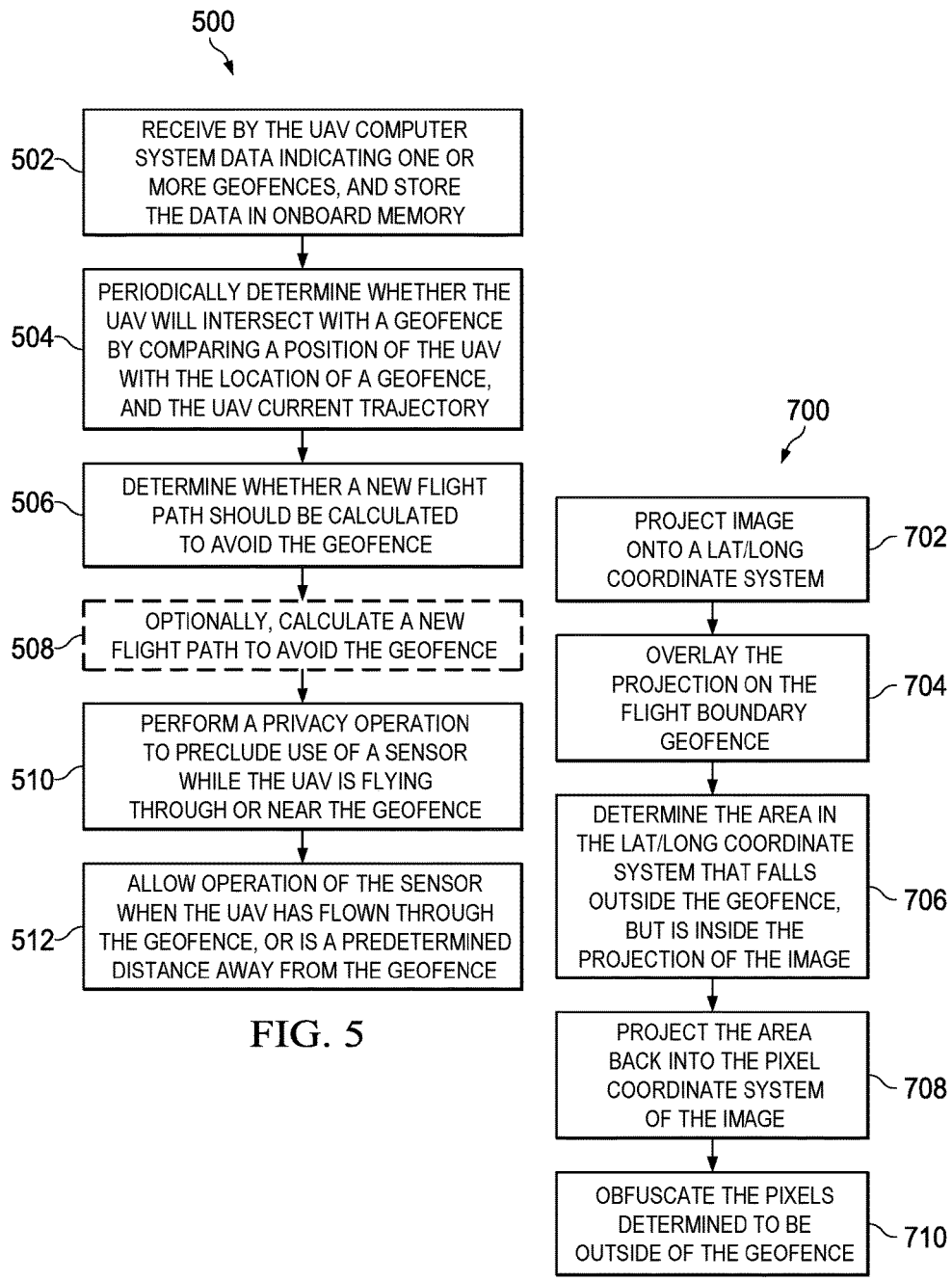
FIG. 5 is a flowchart of an example process of the UAV performing a privacy operation.
FIG. 7 is a flowchart of an example process of the UAV performing an image obfuscation process.

FIG. 5 is a flowchart of an example process of the UAV performing a privacy operation. For convenience, the process 500 will be described as being performed by a system of one or more processors, such as the system 100 described in reference to FIG. 1.

The UAV obtains privacy geofence data describing one or more privacy geofences (block 502). The privacy geofence data may be received from a GCS 213, FPS 200, or the UAV may be configured to wirelessly access the Internet or other network to access sites that contain privacy geofences. The privacy geofences may also be created by the UAV computer system. Address information, and other geolocation information may be provided to the UAV for storage in onboard memory. If the geolocation information for an address, for example, only includes a point of information such as latitudinal/longitudinal coordinates, the UAV computer system may use a radial distance to avoid flying near the address. The radial distance may be a set distance, or may be a variable distance. In certain situations, multiple addresses may be located near each other. In such instances, the computer system may use a distance general greater than a distance that may be used for a single address. These radial avoid distances may also be generated by the GCS 213 or FPS 200 and provided to the UAV. The privacy geofence for different locations thus may have different sized boundaries that may be based on characteristics of the location.

Next the UAV navigates along a flight path and periodically obtains flight information of the UAV from a GNSS receiver, where the flight information is a geospatial position identifying the location of the UAV in 3D-space. As the UAV travels along the flight path, the UAV determines a distance of the UAV to a boundary (e.g., a closest boundary) of the nearest geofence (block 504).

The UAV computer system determines the privacy geofence type and in response determines whether a new flight path should be calculated (block 506). The UAV will then continue along an existing flight path and enter the privacy geofence or, optionally, will calculate a path around the geofence (block 508).

The UAV then performs a privacy operation if the UAV's primary computer system determines that the UAV is within a predetermined distance to the boundary of the privacy geofence (e.g., a closest boundary) or is flying through a geofence with privacy controls enabled. (block 510). Also, the UAV primary computer system can log a sensor name/ID, date, time, geospatial coordinates of when the UAV disabled the sensor (e.g., disable a camera) or other device (e.g., a payload device).

Once the UAV has flown through the geofence, or around the geofence, the UAV primary computer system allows the operation of the sensor to resume. In the case of the UAV, having to avoid the geofence, a sensor may be enabled after the UAV has flown a predetermined distance from the geofence, or enabled if the direction of data capture of the sensor (e.g., the direction of a camera lens) is pointing away from the privacy geofence so that images of structures within the privacy geofence cannot be captured.

Restriction of Sensor or Payload Device

When the UAV conducts a flight operation, via autopilot or manual control, the position of a sensor or a payload device may be controlled based on proximity to the boundary of the privacy geofence. For example, the UAV may be configured such that a sensor (e.g., a camera), points away from the boundary of the geofence, temporarily inactivates, or suspends operation based on a threshold distance from the boundary of the privacy geofence. The computer system of the UAV determines its geospatial position. Based on proximity of the geospatial position of the UAV to the boundary of the privacy geofence, the UAV can maintain the orientation of the sensor so that the sensor will point away from the boundary of the privacy geofence. The UAV may orient the body of the UAV, or in the case of a gimbaled sensor, position the sensor to point away from the boundary of the privacy geofence. Also, if the UAV is flying over a privacy geofence then a gimbaled sensor may be rotated upwardly (e.g., rotated upwardly with respect to a local level coordinate frame) so that the sensor cannot collect data over the privacy geofence. Additionally, the computer system may limit power or control of a gimbal system for the sensor or payload devices.

When the UAV conducts a flight operation, via autopilot or manual control, functional operation of sensors or payload devices may be controlled based on proximity to the boundary of the geofence. For example, the UAV may be configured such that a connected sensor (e.g., a camera) will not trigger. The computer system of the UAV determines its geospatial position. Based on the geospatial position of the UAV in proximity to the boundary of the geofence, the UAV will not trigger the sensor. For example, for a UAV flight over a particular geofence, the UAV may inhibit operation of a camera or other sensor. Operation may be inhibited when the UAV is approaching the geofence boundary within a threshold distance, or when the UAV is flying at a particular distance above a privacy geofence (Above Ground), or when the UAV is flying through a privacy geofence.

TABLE 1

| Sensor | Threshold Distance | AG Limits |
| --- | --- | --- |
| Photographic Camera | 20 meters | 100 meters |
| Video Camera | 30 meters | 100 meters |
| Infrared Camera | 5 meters | 200 meters |
| UV Camera | 10 meters | 200 meters |

The threshold distance can either be a predetermined distance from a geofence ceiling or from the ground. Table 1 shows an example of how particular sensors may be configured for operation near a privacy geofence. Table 1 is illustrative, and not meant to limit the available sensors or distance that may be associated with a sensor.

As shown in Table 1, the UAV may determine its position to a privacy geofence. If a camera is attached as a payload device, the UAV primary computer system 100 may inhibit operation of the camera when the UAV is within 20 meters of the boundary of the privacy geofence. In another example, when the UAV travels above a privacy geofence at 100 meters operation of the camera is inhibited.

Based on a current position of the UAV, the UAV can determine a time that the UAV will be within the threshold distance of the boundary of the privacy geofence or will cross over the privacy geofence boundary. The time can be calculated based on the velocity and trajectory of the UAV towards the geofence. Also, the distance can be variable based on the altitude of the UAV. For example, the field of view of a camera or a sensor is greater at a higher altitude.

Additionally, a geofence may be assigned to a privacy geofence type which determines how various sensors or payload devices may be operable or inoperable. For example, for a particular privacy geofence certain sensors or other devices may be allowed to operate while other sensors or devices may not be allowed to operate. An inoperable sensor is a sensor that is deactivated or a sensor that is restricted from collecting data. A flight path of a UAV may be configured where the UAV flies over, through, or near two different privacy geofences. As an example, a first geofence may be set around a first parcel of land. A second geofence may be set around a nearby second parcel of land. The first geofence may have a geofence type 1 and the second geofence may have a second geofence type 2.

As shown in Table 2, the geofence type associated with a geofence may specify how a sensor or payload device operates. Table 2 is illustrative, and not meant to limit the scope or functions that may be assigned to a geofence type.

TABLE 2

| Geofence Type | Sensor | Operable | AZ Range | EL Range |
| --- | --- | --- | --- | --- |
| Type 1 | Camera | NO | — | — |
| Type 1 | Infrared Camera | NO | — | — |
| Type 1 | UV Camera | NO | — | — |
| Type 2 | Camera | NO | — | — |

TABLE 2-continued

| Geofence Type | Sensor | Operable | AZ Range | EL Range |
|---|---|---|---|---|
| Type 2 | Infrared Camera | YES | — | — |
| Type 2 | UV Camera | YES | — | — |
| Type 3 | Camera | YES | −60° to 60° | 0° to 85° |
| Type 3 | Infrared Camera | YES | −60° to 60° | 0° to 85° |
| Type 3 | UV Camera | YES | −60° to 60° | 0° to 85° |

If a flight path is set where the UAV flies over the first, second geofence and third, the UAV sensors may allow for certain operations. As an example referring to Table 2, if the first geofence is assigned Type 1, then neither a camera, infrared camera, or UV camera would be operable if the UAV flies over the first geofence. If the UAV flies over the second geofence, then a camera would not be operable, but an infrared camera or UV camera would be operable. If the UAV flies over the third geofence, the camera, infrared camera and UV camera would be operable but the direction of each camera's field of view would be restricted to, for example, a range of azimuth (AZ) and elevation (EL) angles in a suitable coordinate frame (e.g., local level coordinate frame, camera platform coordinates). In Table 2, each sensor is restricted to an azimuth of −60° to 60° and an elevation of 0° to 85°. Accordingly, a sensor can be operable and but still have its functionality restricted based on a geofence type.

Population Density

The UAV may take into consideration whether the UAV is flying above an area with a certain population density, which is a measurement of human population per unit area or unit volume. For example, a flight planning system, or ground control system, may analyze population density at a given geographic location. If a flight path is set over a populated area having a threshold population density, then the UAV may be configured to limit certain flight operations, or sensor or payload device operations or functionality. For example, if the UAV flies over a threshold population density, then the UAV may be configured to disable or restrict use of its camera, or other sensors or payload devices. Moreover, an FPS 200 or GCS 213 may plan the flight path such that the UAV maintains a particular altitude or distance above the populated area. Population density for geographic areas may be found via available public data sources or estimated. A privacy geofence may be generated based on the population density for a given area. For example, in a highly populated or dense area, a privacy geofence may be created by the FPS covering the dense areas. The altitude or above ground limits of the privacy geofence may be adjusted according to the density of the area. The higher the population density, the higher ceiling of the privacy geofence may be set. In other words, in dense areas the UAV would be required to fly at a higher altitude, or above ground level distance height, than in a less dense area. Moreover, the UAV may store on board in memory, information, or heat maps, indicating population density level, and then the UAV may dynamically adjust its altitude based on the density level. Also, the UAV may dynamically create a flight plan to fly around a densely populated area. Privacy controls may be automatically enabled, or "turned-on" based on population density, or criteria.

Beacon or Other Wireless Signal

The UAV may optionally be configured to detect certain wireless signals from a signal source, such as a radio frequency (RF) or microwave signals source. When the UAV receives indication of a particular wireless signal, the UAV may enter into a privacy mode where certain computer processing operations or flight operations are performed, or are disabled or restricted. For example, the UAV may disable or restrict operation of a camera. The UAV may receive or calculate signal strength indicator (RSSI) values to determine how close the UAV is to the signal source. Based on an estimated distance to the signal source, the UAV may perform operations meant to maintain the privacy of the area around the signal source. For example, a UAV may detect Wi-Fi router signals, cell phone signals or other radio tower signals, frequency modulation (FM) signals, amplitude modulation (AM) signals, microwave signals, Bluetooth signals or other wireless signals. When the UAV detects proximity to the signal source, the UAV may conduct a flight operation, such as increase altitude or change the flight path to maintain a certain distance from the signal source. Additionally, the UAV may inhibit operation of certain sensors or payload devices. As a safety consideration, the UAV may detect proximity to a wireless signal emanating from a mobile device, such as a mobile phone or tablet computer. The UAV may be configured such that when the UAV detects the signal from the mobile device, the UAV stays a minimally safe distance from the mobile device, such as 2 meters from the mobile device. If the device uses BTLE (Bluetooth low energy) for example, the UAV can determine a proximate distance to the mobile device. The UAV may maintain a distance from the signal source so that a determined signal strength is below a threshold value. In some implementations, a signal source can be associated with a property and broadcast information pertaining to the property. Such information may include, for example, property boundaries and a preference for privacy for an individual or business. In an example scenario, a residential property owner broadcasts their residential property boundaries (e.g., latitude, longitude) to assist a UAV to avoid flying over the property or provide a flight path or corridor over the property for the UAV. Other preferences can include that only certain types of UAVs (e.g., fixed wing) may fly over the property and only at certain altitudes above the property. In another example scenario, a signal source may broadcast landing coordinates defining a safe landing zone on the property, for example, to deliver a package or make a contingency landing.

While the above discusses various operations of a UAV with regard to inflight privacy operations, the FPS 200 or GCS 200 may also determine a flight plan with way points that include commands to cause sensors and devices to maintain privacy as described above, such as inhibiting operation or maintaining orientation of payload devices or field of view of sensors. For example, the FPS may calculate a flight path for a UAV within a flight boundary geofence. The FPS considers the boundary of the flight boundary geofence, and of any privacy geofences included wholly or partially within the flight boundary geofence. A flight path may be determined based on the type of privacy geofence where for example, flight of the UAV is allowed anywhere within the flight boundary geofence, but inhibits the path of the UAV through a privacy geofence. In such case, the FPS would not create a flight path, or allow a user manually determined flight path, that would pass through the privacy geofence. In those instances, where the privacy geofence is of a type that allows pass through, but requires inhibition of certain sensors or payload devices, the flight path may be allowed through privacy geofence, but commands to orient or inhibit the sensors would be included with the flight plan that is provided to the GCS or to the UAV. For example, a waypoint may be added to the flight plan at a position before the UAV would enter into a privacy geofence. The waypoint could include an associated sensor command, such as inhibit the sensor, or orient the sensor such that the sensor cannot obtain sensor information describing anything within the privacy geofence. Another waypoint could be set when the UAV exits the privacy geofence that reorients the sensor, or allows the sensor, to resume obtaining sensor information.

Image Obfuscation

There may be instances when a UAV is collecting data close to a boundary of a geofence. In such instances, images or other information may be collected beyond the geofence boundary. For example, if a UAV is hovering close to a geofence boundary, a still image or video taken may include an image or frame with image data that partially exceeds the boundary of the geofence. Images obtained from an aerial inspection can be modified to automatically blur or otherwise obfuscate portions that illustrate other properties besides the property being inspected. Based on the position and attitude of the UAV and/or the direction/heading of the camera, the UAV operating system can determine whether the camera will take, or has taken, still images or video, or whether the other sensors will collect image data beyond the geofence boundary. Additionally, the UAV operating system can limit the number of still images or video taken with another property in the camera's field of view.

To reduce the amount of real-time computations performed by the UAV, in some applications a mission can be simulated on a flight simulator (e.g., by the flight description module 210) prior to performing the actual mission so that the flight path or camera parameters can be adjusted appropriately along a mission timeline and/or flight path to ensure adherence to any privacy protocol or regulation. For example, camera settings or UAV attitude or altitude adjustments may be made automatically according to a flight plan. For example, arrival of the UAV at a particular waypoint and/or at a particular time in the mission, the attitude or altitude of the UAV may be altered, or camera settings may be adjusted, based on privacy concerns. If the mission simulation (using a 3D building model) reveals that at a particular waypoint and sensor orientation the camera field of view will capture a building not within the geofence boundary that has a "facet" that includes a window, door or other object (e.g., a swimming pool), then the camera settings can be set to change the depth of field (DOF) so that the building or object in the background of the image scene is blurred, thus allowing the image to be taken, so that an object of interest in the foreground of the image scene can be captured. Alternatively, object recognition algorithm can be applied to the image to detect the window, door or other private object so that the private object can be obfuscated (e.g., blurred or occluded) locally during the mission or remotely using, for example, a network server. The latter allows for more complex and time consuming algorithms to be applied without interfering with the mission objectives or timeline. The flight description module 210 can generate an flight description or flight plan that can be loaded into UAV memory and used by the primary computer system 200 to perform a mission.

In some implementations, image data can be tagged with metadata indicating the postal address of a private residence that was captured in the image. The metadata may also include a timestamp and camera settings. The tags can be used to index images in a database for later retrieval by property owners. In an example scenario, the database can be made accessible to property owners over a network (e.g., the Internet) who may view the images and make their own determination of whether to have images deleted. For example, a property owner can enter their property address in a search engine to retrieve and review images tagged with their home address.

Figure 6:
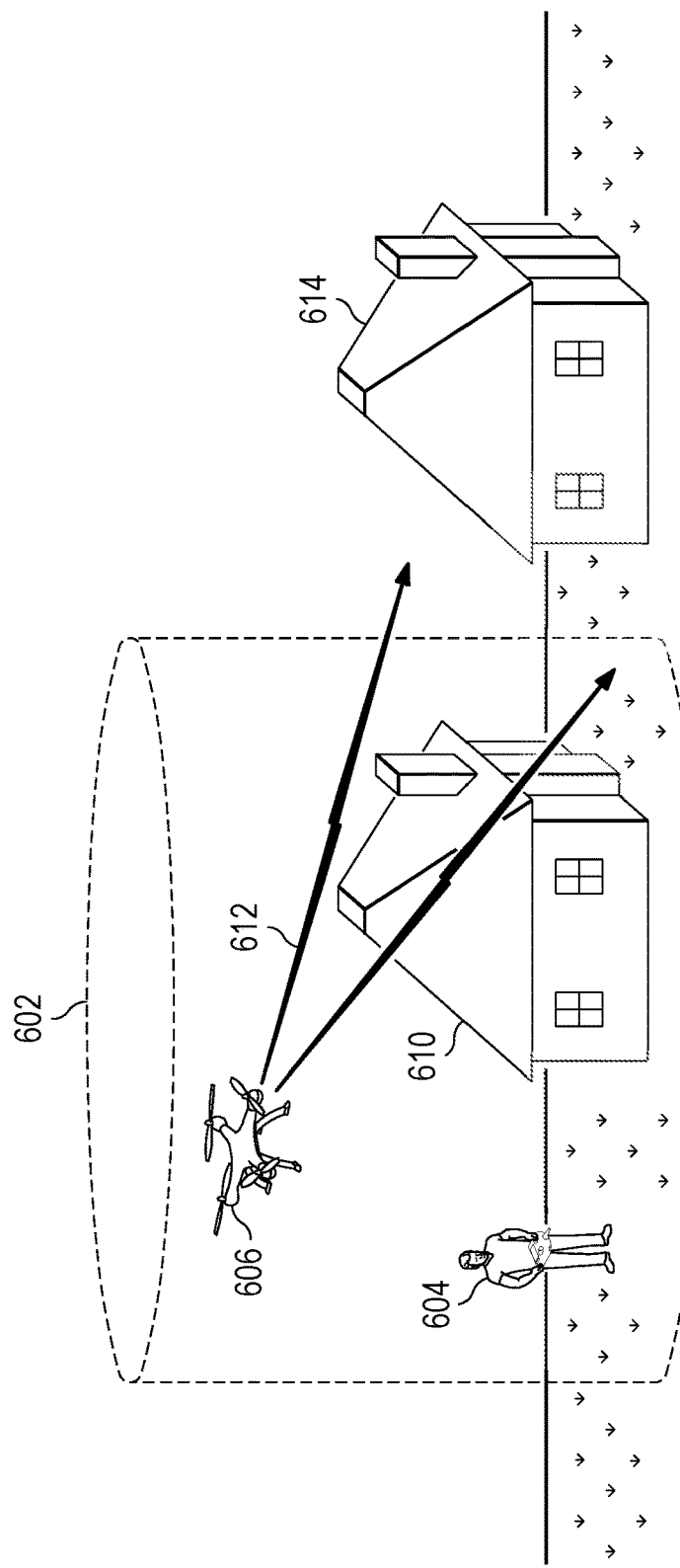
FIG. 6 illustrates an example of a UAV navigating and collecting images beyond a flight boundary geofence.

FIG. 6 illustrates an example of a UAV 606 navigating and collecting images, where the camera captures image data beyond a geofence 602 boundary. A UAV flight module controls UAV navigation along a flight path over a house 610 to be inspected. A ground operator 604 places the UAV at the starting location and then initiates an autopilot mode using a GCS. Optionally the UAV may initiate an autopilot mode after the UAV is placed in a starting location for a predetermined period of time. The UAV ascends to a safe vertical height above the roof of the house 610. During flight, the UAV primary computer system 100 periodically determines the geospatial position of the UAV using information received from an onboard GNSS receiver. Initially, the UAV orients a camera so that the camera's field of view points towards the house 610. The UAV takes a series of digital images or video of the roof house as it flies along the flight path. Occasionally, depending on the orientation, position and altitude of the UAV, the field of view 612 of an onboard data gathering device, such as a digital camera, may include a portion of an adjacent property, or house, 614.

FIG. 7 is a flowchart of an example process 700 of the UAV performing an image obfuscation process. For convenience, the process 700 will be described as being performed by a system of one or more processors, such as the primary computer system 100 described in reference to FIG. 1. Privacy controls can be implemented to obfuscate or blur portions of images that are outside of a property boundary (e.g., a UAV can effect this while in flight, or a flight planning system can later process images after a flight operation is conducted). While the UAV is flying within a flight boundary geofence, sensor data is captured with one or more sensors. An example sensor is a digital camera or video camera. The UAV computer operating system, or flight planning system, can utilize GNSS data, IMU data, ground altitude data, imagery (e.g., satellite imagery) to determine portions of captured images that are to be obfuscated. Based on the direction of the camera, and camera's field of view with respect to a boundary of the flight boundary geofence, the computer system can determine whether the digital image may include a portion of an image showing property outside of the flight boundary geofence. The UAV may with on-board processors obfuscate the portion of the image, or may delete the image if the image is determined to include only data showing an image beyond the flight boundary geofence. Also, the images may be transferred to another system, such a flight planning system, or ground control system where the digital images may be similarly processed.

The portion of the image that exceeds the flight boundary geofence can be obfuscated by a number of techniques. The image can be obfuscated via a process running on the UAV computer system, or can be performed post-image acquisition via a process on a separate computer or data system. An entire image may be blurred or scrambled, or image data modified such that the subject of the image cannot be determined.

While the UAV is conducting a flight operation, via autopilot navigation or via manually controlled operation by a wireless control device, the UAV computer system may log various data associated with the digital images. For example, when the computer system instructs an attached digital camera to take a picture various information can be recorded, for example: heading of the UAV, the geospatial position of the UAV, the altitude of the UAV, the camera field of view, focal length, aperture settings, time the image was taken. If the camera is gimbaled (that is, rotatable) controllable on various axis, a sensor may keep track of the position of the camera to determine its position relative to the heading of the UAV.

In some implementations, process 700 begins by combining one or more of GNSS coordinates, Above Ground Level (AGL) altitude, direction of the camera, camera field of view, camera focal length and other camera parameters to project the image onto a latitude/longitude coordinate system (block 702), warping it as needed, for example, with a Mercator Map projection.

Process 700 then overlays the projection with a flight boundary geofence (which is already defined in a latitude/longitude coordinate system) (block 704).

Process 700 then determines the area in the latitude/longitude coordinate system that falls outside the flight boundary geofence but inside the projection of the taken image (block 706).

Figure 8A:
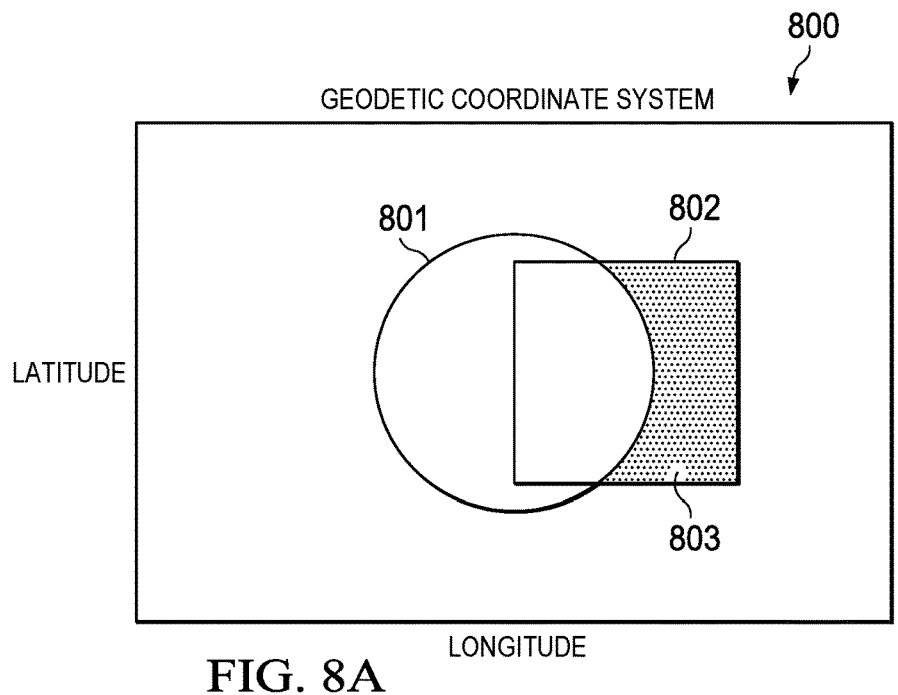
FIGS. 8A and 8B illustrate the process described in FIG. 7.
Figure 8B:
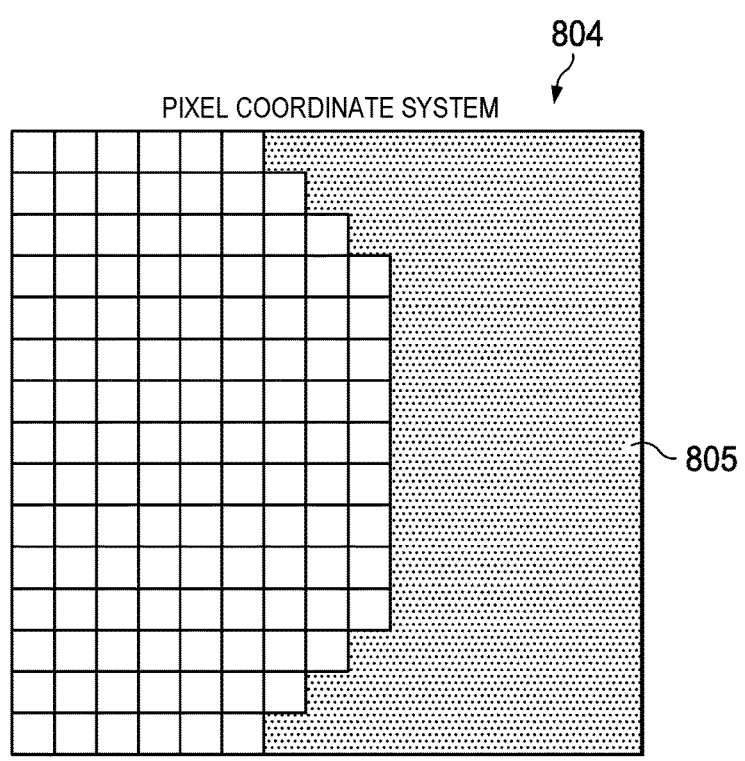

Process 700 then projects this area back into the pixel coordinate system of the image to determine the pixels that that are outside of the flight boundary geofence (block 708), as described in reference to FIGS. 8A and 8B.

Process 700 then obfuscates the pixels determined to be outside the flight boundary geofence (block 710). For example, the image area outside of the flight boundary geofence may be deleted, blurred, scrambled or removed from the image. Also, the pixel Red Green Blue (RGB) values of the area outside of the flight boundary geofence may be overwritten to show a single color (e.g., black, white, red, etc.). Additionally, a Gaussian blur could be used to blur the pixels determined to be outside the flight boundary geofence.

Although the above process is described by a UAV computer system performing image obfuscation. A separate computer system, user device, or FPS may perform the image obfuscation process. These other systems may receive the digital images obtained by the UAV. The images may be obtained during flight of the UAV, or post-flight. Additionally, log data from the UAV may be provided to these other systems during flight or post flight operations. The log data may include information identifying geospatial locations of where the one or more images where taken, time images were taken, the pose, or position of the camera, and other information used by the process to determine the field of view of the camera in relationship to a flight boundary, or privacy boundary geofence. These system may determine that a portion of a digital image includes at least a portion of an object located outside of a boundary of the geofence, and obfuscate a portion of the digital image as discussed herein.

In some implementations, the primary computer system of the UAV can determine a percentage of the pixels of the image that comprise the digital image. And then delete the digital image, or identify the image for deletion, if the percentage exceeds a predetermined threshold value. For example, if the image area outside the geofence is greater than 50%, than the system can be configured to delete the entire image.

The flight planning system can automatically implement privacy controls when generating a 3D model. For instance, a UAV can capture imagery of a particular floor of a skyscraper. When generating a 3D model, other portions of the skyscraper (e.g., other floors) can be blurred out, and/or windows can be recognized and blurred to hide the inside. Additionally, sensors can be utilized that are opaque to glass (e.g., opaque to glass windows).

FIGS. 8A and 8B illustrate the process described in FIG. 7. FIG. 8A shows a projection 802 (e.g., using a homograph transformation) of a camera field of view (e.g., a sensor image) onto a geodetic (latitude/longitude) map projection 800 (e.g., Mercator map projection) that also depicts a flight boundary geofence 801. An area 803 that lies within the projection 802 and outside the flight boundary geofence 801 is determined. If the flight boundary geofence 801 is labeled "A" and the projection 802 of the camera field of view is labeled "B", then applying set theory mathematics, area 803 is the relative complement of A (left) in B (right) or, $$B = \cap A\hat{\ }c = B \backslash A.$$

FIG. 8B illustrates captured image data in pixel coordinates 804 with pixels 805 corresponding to area 803 obfuscated. In some implementations, pixels 805 can be identified for obfuscation by using image segmentation or other edge detector algorithms and pixel occlusion algorithms. In some implementations, pixels 805 can be blurred using, for example, a Gaussian blur filter or scrambled or blocked out (e.g., with a solid color). In some implementations, objects in area 803 that are identified as private (e.g., windows, doors, swimming pools, sun roofs, skylights) can be recognized using object recognition techniques (e.g., image segmentation, machine learning, edge detection, corner detection, blob detection, genetic algorithms, feature-based methods) and then obfuscated, locally or remotely using, for example, a network server. In some implementations, images to be processed can be batch processed. In some implementations, a recognized object can be labeled (e.g., labeled as a "window") and compared to a predetermined list of labeled objects that are designated private and if there is a match between labels, the object can be obfuscated. In some implementations, only the object is obfuscated. In some implementations, images to be processed either locally or remotely can be post-processed using a batch process.

The processes and operations are described above in terms of one or more processors. The processor or processors can be onboard a UAV, onboard a user device, or part of a cloud-based processing system. In particular, a user device can be designated as a GCS and perform functions of a GCS. A user device and a UAV computer system can be designated as a FPS and perform functions of an FPS. Likewise, functions of both the GCS and FPS can be performed by a cloud-based processing system. The image obfuscation techniques described herein can be performed in whole or in part on one or more of the UAV, the GCS or other user device (e.g., a personal computer) or a network-based server.

Various types of UAVs may be used to implement the inventions described herein (for example, a fixed wing airplane, helicopter, a multi-rotor vehicle (e.g., a quadcopter in single propeller and coaxial configurations), a vertical take-off and landing vehicle, lighter than air aircraft). A multi-rotor vehicle in a coaxial configuration may use the same propeller pitch and diameter propellers, use different pitch and diameter propellers, or variable pitch propellers. In this specification, UAVs, such as drones, un-operated aerial vehicles, remotely operated aircraft, unmanned aircraft systems, any aircraft covered under Circular 328 AN/190 classified by the International Civil Aviation Organization, and so on. In addition, certain aspects of the disclosure can be utilized with other types of unmanned vehicles (e.g., wheeled, tracked, and/or water vehicles). Sensors, which are included in the general term payload (e.g., any hardware, software, module, and so on, that is not critical to the flight operation of the UAV) can include any device that captures real-world information, including cameras, radiation measuring instruments, distance detectors such as Lidar, and so on.

Each of the processes, methods, instructions, applications and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart-phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a toolbar, a pop up menu, interactive voice response system, or otherwise.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic data sources can include databases, volatile/non-volatile memory, and any memory system or subsystem that maintains information.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Nothing in the description is intended to imply that any particular element, feature, characteristic, step, module, or block is necessary or indispensable. The novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the to the above-described embodiments, the elements of which are to be understood as being among other acceptable examples. All such modifications and variations are intended to be included herein within the scope of the disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. An unmanned aerial vehicle (UAV) flight processing system, comprising:
   one or more processors operable to:
   navigate the UAV within a geofence, the geofence being a geospatial boundary in which flight operations of the UAV are performed;
   obtain a digital image captured with a camera of the UAV during flight operations within the geofence, wherein the digital image is a single image or a frame from a digital video;
   determine that a portion of the digital image includes at least a portion of an object located outside of the geofence, the determining comprising:
   projecting the digital image onto a geospatial coordinate system; and
   determining in reference to the geospatial coordinate system that the portion of the digital image falls outside a geospatial boundary of the geofence; and
   obfuscate the portion of the digital image located outside the geofence.

2. The system of claim 1, wherein the portion of the digital image is obfuscated while the UAV is navigating within the geofence.

3. The system of claim 1, wherein the portion of the digital image is obfuscated by image blurring.

4. The system of claim 1, wherein the portion of the digital image is obfuscated by adjusting one or more camera parameters prior to capturing the digital image.

5. The system of claim 1, wherein the portion of the digital image is obfuscated by removing pixels of the portion of the digital image.

6. The system of claim 1, wherein the portion of the digital image is obfuscated by adjusting one or more characteristics of pixels of the portion of the digital image.

7. The system of claim 1, wherein the one or more processors are further operable to:
   determine a percentage of the digital image that comprises the portion of the digital image outside the geofence; and
   delete or destroy the entire digital image if the percentage exceeds a threshold value.

8. The system of claim 1, where obfuscating the portion of the digital image further comprises:
   recognizing an object in the portion of the digital image as being private; and
   obfuscating the object.

9. A method comprising:
   navigating, by one or more processors of a flight processing system, an unmanned aerial vehicle (UAV) within a geofence, the geofence being a geospatial boundary in which flight operations of the UAV are performed;
   capturing during flight operations within the geofence, by a camera of the UAV, a digital image, wherein the digital image is a single image or a frame from a digital video;
   determining, by the one or more processors, that a portion of the digital image includes at least a portion of an object located outside the geofence, the determining comprising:
   projecting the digital image onto a geospatial coordinate system; and
   determining in reference to the geospatial coordinate system that the portion of the digital image falls outside a geospatial boundary of the geofence; and
   obfuscating the portion of the digital image located outside the geofence.

10. The method of claim 9, wherein the portion of the digital image is obfuscated on the UAV while the UAV is navigating within the geofence.

11. The method of claim 9, wherein the portion of the digital image is obfuscated by image blurring.

12. The method of claim 9, wherein the portion of the digital image is obfuscated by adjusting one or more camera parameters prior to capturing the digital image.

13. The method of claim 9, wherein the portion of the digital image is obfuscated by removing pixels of the digital image.

14. The method of claim 9, wherein the portion of the digital image is obfuscated by adjusting one or more characteristics of pixels in the portion of the digital image.

15. The method of claim 9, wherein the one or more processors are further operable to:

determine a percentage of the digital image that comprises the portion of the digital image outside the geofence; and delete or destroy the entire digital image if the percentage exceeds a threshold value.

16. The method of claim 9, where obfuscating the portion of the digital image further comprises:

recognizing an object in the portion of the digital image as being private; and obfuscating the object.

17. A processing system, comprising:

receiving, one or more digital images, obtained by an unmanned aerial vehicle (UAV) during flight operations of the UAV within a geofence, the geofence being a geospatial boundary in which flight operations of the UAV were performed;

receiving UAV flight log data from the UAV comprising geospatial locations of where the one or more images where taken;

determining, by the one or more processors, that a portion of a digital image includes at least a portion of an object located outside of a geofence, the determining comprising:

projecting the digital image onto a geospatial coordinate system; and determining in reference to the geospatial coordinate system that the portion of the digital image falls outside a geospatial boundary of the geofence; and obfuscating the portion of the digital image located outside the geofence.

18. The system of claim 17, wherein the portion of the digital image is obfuscated by removing pixels of the digital image.

19. The system of claim 17, wherein the one or more processors are further operable to:

determine a percentage of the digital image that comprises the portion of the digital image outside the geofence; and delete or destroy the entire digital image if the percentage exceeds a threshold value.

20. The method of claim 17, where obfuscating the portion of the digital image further comprises:

recognizing an object in the portion of the digital image as being private; and obfuscating the object.

21. The system of claim 17, wherein the portion of the digital image is obfuscated by adjusting one or more characteristics of pixels in the portion of the digital image.

22. A method implemented by a computer system comprising one or more processors, the method comprising:

receiving, one or more digital images, obtained by an unmanned aerial vehicle (UAV) during flight operations of the UAV;

receiving UAV flight log data obtained from the UAV comprising geospatial locations of where the one or more images where taken;

determining, by the one or more processors, that a portion of a digital image includes at least a portion of an object located outside of a geofence, the geofence being a geospatial boundary in which flight operations of the UAV are performed, the determining comprising:

projecting the digital image onto a geospatial coordinate system; and determining in reference to the geospatial coordinate system that the portion of the digital image falls outside a geospatial boundary of the geofence; and obfuscating the portion of the digital image located outside the geofence.

23. The method of claim 22, wherein the portion of the digital image is obfuscated by removing pixels of the digital image.

24. The method of claim 22, wherein the one or more processors are further operable to:

determine a percentage of the digital image that comprises the portion of the digital image outside the geofence; and delete or destroy the entire digital image if the percentage exceeds a threshold value.

25. The method of claim 22, where obfuscating the portion of the digital image further comprises:

recognizing an object in the portion of the digital image as being private; and obfuscating the object.

26. The method of claim 22, wherein the portion of the digital image is obfuscated by adjusting one or more characteristics of pixels in the portion of the digital image.

27. The flight processing system of claim 1, wherein determining a portion of the object is located outside of the geofence comprises:

displaying in a user interface a representation of the geofence; and determining that the portion includes pixels located outside of the geofence.

28. The method of claim 9, wherein determining a portion of the object is located outside of the geofence comprises:

projecting the digital image onto a geospatial coordinate system; and determining in reference to the geospatial coordinate system that the portion of the digital image falls outside of the geospatial boundary of the geofence.

29. The method of claim 9, wherein determining a portion of the object is located outside of the geofence comprises:

displaying in a user interface a representation of the geofence; and determining that the portion includes pixels located outside of the geofence.

* * * * *